(12) United States Patent
Jong et al.

(10) Patent No.: US 11,781,861 B2
(45) Date of Patent: Oct. 10, 2023

(54) SURFACE MEASUREMENT METHOD, COMPONENT MANUFACTURING METHOD, COMPONENT INSPECTION METHOD, AND COMPONENT MEASUREMENT DEVICE

(71) Applicant: Hitachi Astemo, Ltd., Ibaraki (JP)

(72) Inventors: Jeremy Jong, Hitachinaka (JP);
Kazushi Miyata, Mobara (JP);
Shigenobu Maruyama, Kasumigaura (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 402 days.

(21) Appl. No.: 17/272,672

(22) PCT Filed: Aug. 14, 2019

(86) PCT No.: PCT/JP2019/031930
§ 371 (c)(1),
(2) Date: Mar. 2, 2021

(87) PCT Pub. No.: WO2020/049971
PCT Pub. Date: Mar. 12, 2020

(65) Prior Publication Data
US 2021/0270603 A1    Sep. 2, 2021

(30) Foreign Application Priority Data
Sep. 6, 2018    (JP) .................. 2018-167261

(51) Int. Cl.
*G01B 11/30*    (2006.01)
*G01N 21/55*    (2014.01)
*G01N 21/952*    (2006.01)

(52) U.S. Cl.
CPC ........... *G01B 11/303* (2013.01); *G01N 21/55* (2013.01); *G01N 21/952* (2013.01)

(58) Field of Classification Search
CPC ..... G01B 11/303; G01N 21/55; G01N 21/952
See application file for complete search history.

(56) References Cited

U.S. PATENT DOCUMENTS 3,930,994 A * 1/1976 Conway ................ B07C 5/3416
                                                                209/579
4,853,777 A * 8/1989 Hupp ................... G01B 11/303
                                                                356/613
(Continued)

FOREIGN PATENT DOCUMENTS

JP    2002-139447 A    5/2002
JP    2003-83722 A    3/2003
(Continued)

OTHER PUBLICATIONS

International Search Report received in corresponding International Application No. PCT/JP2019/031930 dated Oct. 2019.
(Continued)

*Primary Examiner* — Dominic J Bologna
*Assistant Examiner* — Jarreas C Underwood
(74) *Attorney, Agent, or Firm* — MATTINGLY & MALUR, PC

(57) ABSTRACT

In a surface measurement method, a measurement surface is irradiated with a coherent light beam, reflected light reflected from the measurement surface is projected to a screen to form an optical image; and the optical image is captured by an optical sensor when the screen is continuously moved in one direction when the optical image is captured by the optical sensor.

15 Claims, 18 Drawing Sheets

(56) References Cited

U.S. PATENT DOCUMENTS

| | | | | |
|---|---|---|---|---|
| 5,715,050 A * | 2/1998 | Haga | ................... | G02B 21/088 |
| | | | | 250/559.44 |
| 5,880,843 A * | 3/1999 | Hermosillo-Valadez | ................... | |
| | | | | G01N 21/896 |
| | | | | 356/600 |
| 7,932,490 B2 * | 4/2011 | Wang | ................ | G01N 15/0205 |
| | | | | 73/30.01 |
| 8,817,274 B2 * | 8/2014 | Seo | ....................... | G01B 11/16 |
| | | | | 356/630 |
| 2006/0066862 A1 * | 3/2006 | Wadman | ................ | G01N 21/47 |
| | | | | 356/446 |
| 2007/0035826 A1 | 2/2007 | Yokoyama et al. | | |
| 2007/0146691 A1 * | 6/2007 | Zaman | ................. | G01N 21/952 |
| | | | | 356/237.2 |
| 2021/0389240 A1 * | 12/2021 | Labayrade | ........... | G01J 1/0242 |

FOREIGN PATENT DOCUMENTS

| | | | |
|---|---|---|---|
| JP | 2005-107150 A | 4/2005 | |
| WO | WO-9312615 A1 * | 6/1993 | ........... G01B 11/303 |
| WO | 2014/167672 A1 | 10/2014 | |

OTHER PUBLICATIONS

Written Opinion received in corresponding International Application No. PCT/JP2019/031930 dated Oct. 15, 2019.

* cited by examiner

SURFACE MEASUREMENT METHOD, COMPONENT MANUFACTURING METHOD, COMPONENT INSPECTION METHOD, AND COMPONENT MEASUREMENT DEVICE

TECHNICAL FIELD

The present invention relates to a surface measurement method, a component manufacturing method, a component inspection method, and a component measurement device.

Priority is claimed on Japanese Patent Application No. 2018-167261, filed Sep. 6, 2018, the content of which is incorporated herein by reference.

BACKGROUND ART

There are technologies for reducing an influence of speckle noise (for example, see Patent Literatures 1 and 2).

CITATION LIST

Patent Literature

[Patent Literature 1]
Japanese Unexamined Patent Application, First Publication No. 2005-107150
[Patent Literature 2]
PCT International Publication No. WO 2014/167672

SUMMARY OF INVENTION

Technical Problem

It is preferable to further reduce the influence of speckle noise.

The present invention provides a surface measurement method, a component manufacturing method, a component inspection method, and a component measurement device capable of reducing an influence of speckle noise.

Solution to Problem

According to a first aspect of the present invention, a surface measurement method includes: irradiating a measurement surface with a coherent light beam; projecting reflected light reflected from the measurement surface to a screen to form an optical image; and capturing the optical image by an optical sensor. The optical image is captured by the optical sensor while the screen is continuously moved in one direction.

According to a second aspect of the present invention, a method of manufacturing a component having a measurement surface includes: a processing step of performing mirror surface processing on the measurement surface; an inspection step of irradiating the measurement surface with a coherent light beam, projecting reflected light reflected from the measurement surface to a screen to form an optical image, and capturing the optical image by an optical sensor; an evaluating step of determining whether the component is proper based on an imaging result of the inspection step; and a transporting step of transporting the component to a different location in accordance with an evaluation result of the evaluating step. The inspection step is performed while continuously moving the screen in one direction.

According to a third aspect of the present invention, a method of inspecting a component having a measurement surface with a mirrored surface includes: an image forming step of irradiating the measurement surface with a coherent light beam, projecting reflected light reflected from the measurement surface to a screen to form an optical image; and an imaging step of capturing the optical image formed on the screen by the optical sensor. The imaging step is performed while continuously moving the screen in one direction at a constant speed irrespective of a position of the optical image in a width direction.

According to a fourth aspect of the present invention, a measurement device measuring a measurement surface of a component includes: an irradiation unit configured to form a coherent light beam in a slit shape and radiating the light beam toward the measurement surface of the component; a movement unit configured to relatively move the light beam radiated from the irradiation unit and the measurement surface of the component; a screen on which reflected light reflected from the measurement surface of the component is projected to form an optical image; an optical sensor configured to capture the optical image; and a driving source configured to continuously move the screen in one direction.

Advantageous Effects of Invention

The surface measurement method, the component manufacturing method, the component inspection method, and the component measurement device are capable of reducing an influence of speckle noise.

BRIEF DESCRIPTION OF DRAWINGS

FIG. 15(b) illustrates a case in which there is a protruding defect, and FIG. 15(c) illustrates a case in which there is a recessed defect.

DESCRIPTION OF EMBODIMENTS

First, a measurement principle will be described.

Figure 1:
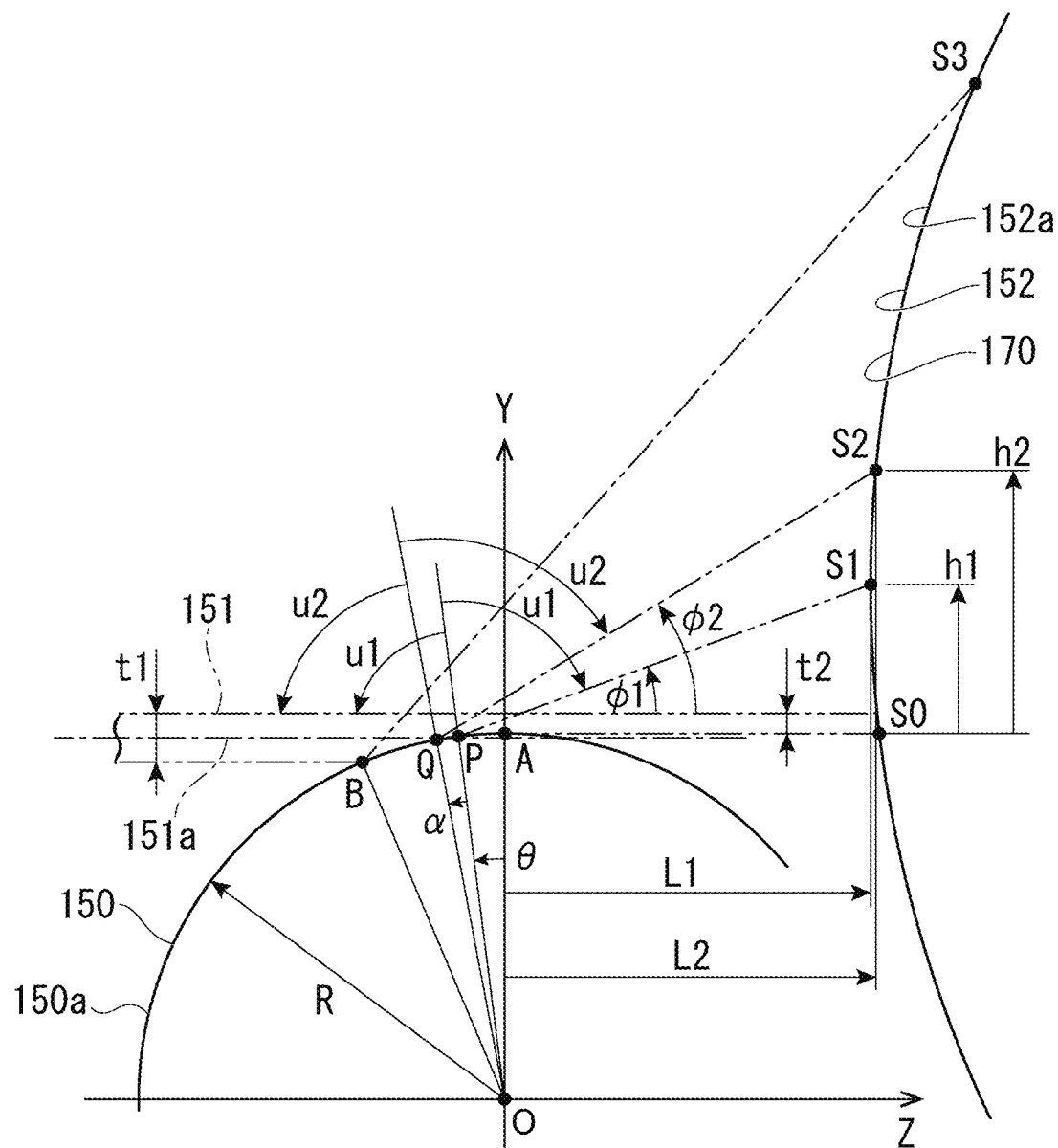
FIG. 1 is a diagram illustrating a principle of the present invention underlying a state in which an optical image formed by reflected light reflected from the surface of a cylindrical component expands and is projected to a screen.
Figure 2:
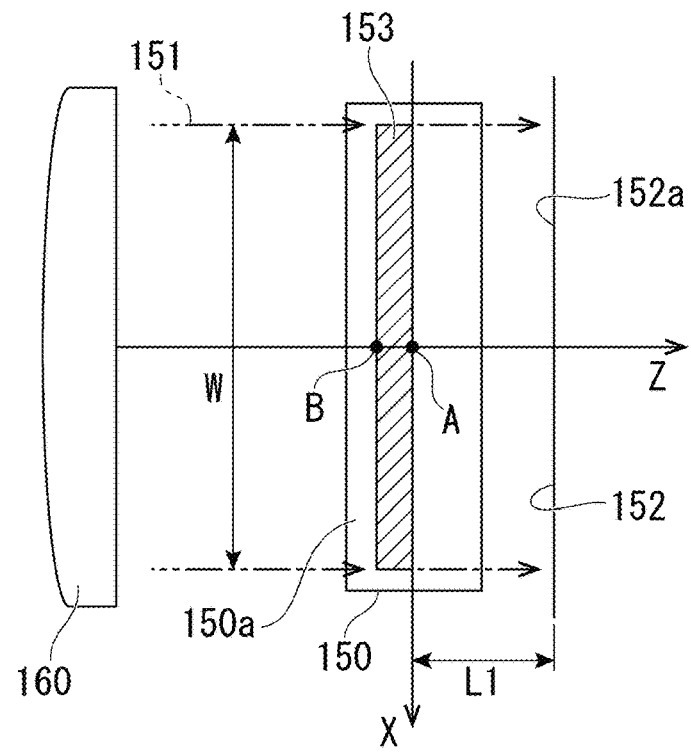
FIG. 2 is a diagram illustrating a light irradiation region on the component illustrated in FIG. 1.

FIG. 1 shows a state in which an optical image formed by reflected light reflected from the surface of a cylindrical component expands and is projected to a screen. FIG. 2 is a diagram illustrating a light irradiation region on the component illustrated in FIG. 1.

A component 150 which is an inspection target is a member of which a cross-sectional shape is a circle with a central axis O. That is, the component 150 is a columnar or cylindrical member. FIG. 1 is a cutaway diagram illustrating the component 150 cut away along a plane orthogonal to an axial direction. The component 150 has a vertex A on the Y axis. In the following description, the X, Y, and Z directions are set as illustrated. The Y and Z directions are orthogonal to each other and the X direction is orthogonal to the Y and Z directions. The Y axis is located on a straight line connecting the central axis O of the component 150 to the vertex A.

The component 150 is irradiated with belt-like irradiation light 151 with a width (a length in the X direction) W×a thickness (a length in the Y direction) t1. The thickness t1 of the irradiation light 151 is smaller than a radius R of the component 150. An optical axis 151a of the irradiation light 151 is parallel to the XZ plane. A range of a thickness t1 from the upper side of the vertex A of the component 150 in the Y direction to an illumination incidence point B of an outer circumferential surface 150a of the component 150 is irradiated with the irradiation light 151. That is, the irradiation light 151 includes a light beam which is a point tangent to the component 150 at the vertex A. This light beam is substantially parallel to the optical axis 151a of the irradiation light 151. Accordingly, the irradiation light 151 is radiated in a tangential direction to of the component 150 at the vertex A. The optical axis 151a of the irradiation light 151 is located at a point P of the outer circumferential surface 150a of the component 150 between the vertex A of the component 150 and the illumination incidence point B in the Y direction.

On the opposite side to the side of the component 150 irradiated with the irradiation light 151, a cylindrical screen 152 is disposed at a position away from the central axis O of the component 150. The screen 152 is cylindrical and is disposed so that the central axis is parallel to the X axis. That is, the screen 152 has an outer circumferential surface 152a which is a cylindrical surface and is disposed so that the central axis of the outer circumferential surface 152a is parallel to the X axis.

An arc AB of the outer circumferential surface 150a of the component 150 is irradiated with part of the irradiation light 151. The remaining part of the irradiation light 151 above the vertex A of the component 150 passes through the outer circumferential surface 150a of the component 150, and is directly radiated as reference light to the screen 152 to form a reference image. When a point at which the light beam coming into contact with the vertex A is projected to the screen 152 is a reference position S0, a position of the component 150 in the height direction is adjusted so that the vertex A of the component 150 and the reference position S0 projected to the screen 152 have the same height in the Y direction. The point S0 on the screen 152 is defined as a reference position. Accordingly, the arc AB of the outer circumferential surface 150a of the component 150 is irradiated with the irradiation light 151 having the belt-like shape of the width W below the reference position S0. In FIG. 2, an irradiation region 153 radiated to the arc AB of the outer circumferential surface 150a of the component 150 is hatched by diagonal lines. The irradiation light 151 is radiated toward the component 150 and the screen 152 via a cylindrical lens 160 from an irradiation light source (not illustrated).

In FIG. 1, θ is an angle of a point P of the component 150 from the Y axis. The point P of the component 150 is defined as a specific position. As described above, the position of the optical axis 151a of the irradiation light 151 matches the specific position P. An angle of incidence and an angle of reflection of the irradiation light 151 at the specific position P are all u1.

A light beam reflected at the specific position P reaches a point S1 on the outer circumferential surface 152a of the screen 152. When $\phi 1$ is an angle of elevation of the light reflected from the specific position P, a height h1 from the reference position S0 to the point S1 on the screen 152 can be obtained by Expression (1) that includes a distance L1 from the central axis O of the component 150 to the point S1 in the Z direction.

$$h1 = \tan(\phi 1)(L1 + R \cdot \sin \theta) - R(1 - \cos \theta) \tag{1}$$

Here, $\phi 1 = 180 - 2 \cdot u1$ and $u1 = 90 - \theta$ are satisfied. Accordingly, $\phi 1 = 2\theta$ is satisfied. A thickness t2 of the irradiation light 151 directly radiated to the screen 152 is $t1/2 - R(1 - \cos \theta)$.

At a point Q on the arc AB moved by a minute angle from the specific position P, an angle of incidence and an angle of reflection of the irradiation light 151 are both u2. A light beam reflected at the point Q reaches a point S2 on the screen 152. When $\phi 2$ is an angle of elevation of light reflected from the point Q, a height h2 from the reference position S0 to the point S2 on the outer circumferential surface 152a of the screen 152 can be obtained by Expression (2) that includes a distance L2 from the central axis O of the component 150 to the point S2 in the Z direction.

$$h2 = \tan(\phi 2) \cdot (L2 + R \cdot \sin(\theta + \alpha)) - R(1 - \cos(\theta + \alpha)) \tag{2}$$

Here, $\phi 2 = 180 - 2 \cdot u2$ and $u2 = 90 - (\theta + \alpha)$ are satisfied. Accordingly, $\phi 2 = 2(\theta + \alpha)$ is satisfied. In addition, $\alpha$ is a central angle with respect to an arc PQ.

Similarly, a light beam reflected at the illumination incidence point B on the outer circumference of the component 150 reaches a point S3 on the screen 152. Accordingly, the light radiated to the arc AB is projected to a range of the points S0 to S3 on the screen 152. In the present invention, an unevenness of the outer circumferential surface 150a of the component 150 is manifested as shade of the reflected light projected to the screen 152 using a so-called magic mirror principle.

As will be described in detail in the embodiment, the height h1 which is calculated by Expression (1) and is measured from the reference position S0 of the point S1 at which the reflected light at the specific position P of the component 150 is projected to the screen 152 is 5.39 mm in the case in which the radius R is 11 mm, and is 5.30 mm in the case in which the radius R is 14 mm. That is, a difference in h1 in the cases of the radius of 11 mm and 14 mm is no more than 0.09 mm. This value is smaller than a pixel dimension c (for example, about 55 μm) of one pixel in a line sensor camera (see a line sensor camera 107 in FIG. 7) on the outer circumferential surface 152a of the screen 152.

The height of the component 150 or the screen 152 is adjusted so that the reference position S0 of the screen and the vertex A of the component 150 match in accordance with the size of the radius of the component 150.

Next, a magnification of a minute region (the arc PQ) on the component 150 is calculated. When d is the arc PQ, a magnification M in the circumferential direction on the outer circumferential surface 152a of the screen 152 is obtained from Expression (3).

$$M = (h2 - h1)/d \tag{3}$$

In other words, d of the arc PQ is expanded to $h2 - h1 = H$.

Here, h1 and h2 are obtained from Expressions (1) and (2), respectively. Defect detection sensitivity is improved as the angle of incidence of the irradiation light 151 at the specific position P is closer to 90°. Therefore, when inspection is performed under the condition that θ is equal to or less than around 5°, the second term of Expression (1) can be handled as $R(1 - \cos \theta) \approx 0$. Further, when $L1 \gg R$ is taken into consideration, approximation can be performed as $(L1 + R \cdot \sin(\theta + \alpha)) \approx L$. Accordingly, Expression (3) can be interpreted as the simplified Expression (4).

$$M = L1(\tan(\phi 2) - \tan(\phi 1))/d \tag{4}$$

As described above, $\phi 1 = 2\theta$ and $\theta 2 = 2(\theta + \alpha)$ are satisfied. In addition, $\alpha = 360 \cdot d/2\pi R$ is satisfied. Accordingly, when the arc PQ handled as the minute region, that is, the dimension of d, is constant, the magnification M increases with an increase in θ or L. That is, under the condition that L is constant, when an image on the component 150 (when there is a defect, an optical image including the defect) according to a first embodiment of the present invention is projected to the screen 152, the magnification differs in accordance with a height (a position in the Y direction) on the screen 152.

First Embodiment

A first embodiment of the present invention will be described.

Figure 3:
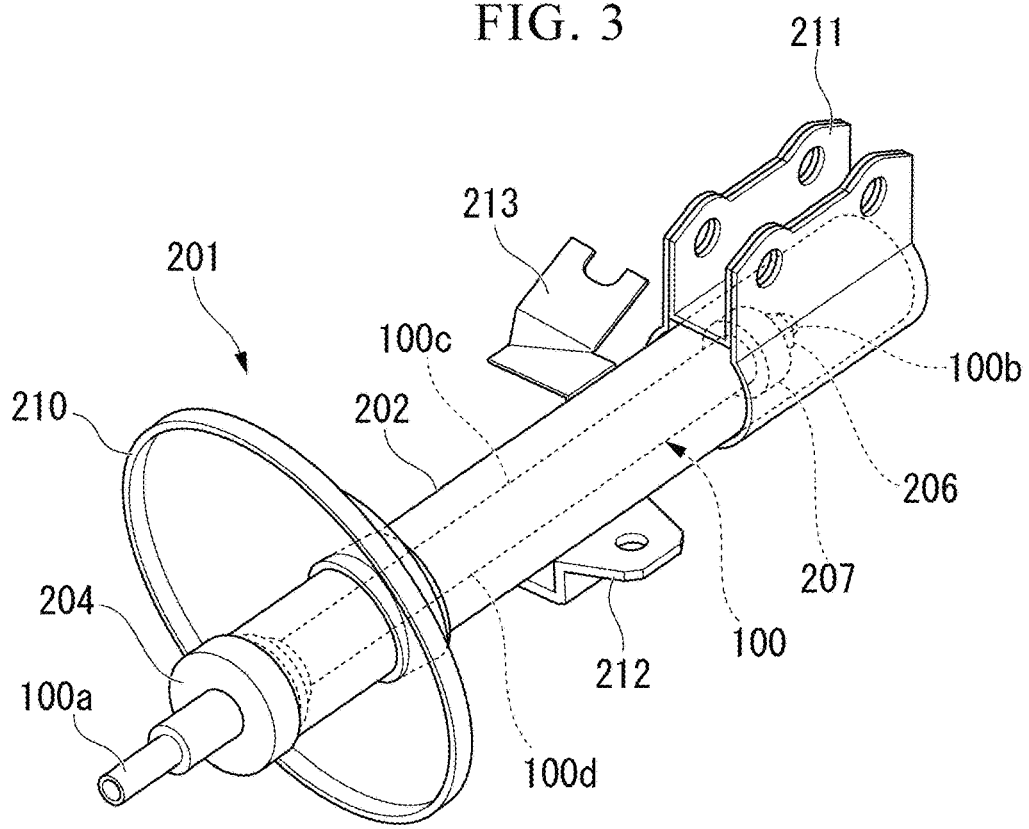
FIG. 3 is a perspective view illustrating a shock absorber including a piston rod which is a measurement target according to a first embodiment.

In the first embodiment, a component that has a cylindrical outer circumferential surface is manufactured while the cylindrical outer circumferential surface is measured and inspected. As the component, for example, there is a piston rod of a shock absorber, a piston pin of an internal combustion engine, or a piston such as a rotary pump, a hydraulic cylinder, or a brake device. Here, a case in which a piston rod 100 which is a component of a shock absorber 201 illustrated in FIG. 3 is manufactured while being measured and inspected will be described as an example.

The shock absorber 201 includes a cylinder 202 having a bottomed cylindrical shape, the piston rod 100 of which one end is inserted into the cylinder 202 and the other end extends from an opening (not illustrated) of the cylinder 202 to the outside, and a cover 204 fitted to the cylinder 202 to cover the opening side of the cylinder 202. The cover 204 is fitted on the opening side of the cylinder 202 to cover a sealing member (not illustrated) that seals a gap between the piston rod 100 and the cylinder 202. The shock absorber 201 includes a piston 207 fixed to an end of the piston rod 100 inside the cylinder 202 by a nut 206. The piston 207 partitions the inside of the cylinder 202 into two chambers. The piston 207 moves integrally with the piston rod 100 to be slid inside the cylinder 202. The shock absorber 201 inhibits movement of a working fluid between two chambers generated along a fluid passage of the piston 207 due to movement of the piston rod 100 with respect to the cylinder 202 in an axial direction and generates a damping force.

The shock absorber 201 includes a spring sheet 210 fitted on the outside of the cylinder 202, a main bracket 211, a harness bracket 212, and a hose bracket 213. The spring sheet 210 holds a spring with an unsprung mass of a vehicle. The main bracket 211 connects the shock absorber 201 to a sprung mass of the vehicle. The harness bracket 212 supports a harness. The hose bracket 213 supports a hose. The shock absorber 201 is incorporated into the body of the vehicle as a suspension strut assembly along with a spring (not illustrated) supported by the spring sheet 210. The piston rod 100 is slid to come into contact with the inner circumferential surface of a sealing member (not illustrated) on the outer circumferential surface at the time of movement in the axial direction with respect to the cylinder 202.

When there is an unevenness of a few μm on the surface of the piston rod 100, the piston rod 100 may damage the sealing member and thus leads to oil leakage of the shock absorber 201. The roundness and cylindricity of the piston rod 100 are managed on a micrometer order and an arithmetic mean estimation (Ra) of the surface is equal to or less than 0.05 μm. The piston rod 100 is a cylindrical component formed of low carbon steel such as S25C. After a hardening and forming step has performed, the piston rod 100 is subjected to surface treatment to finish the surface flatly and moves to an assembly process. The piston rod 100 which is an inspection target is formed with a diameter of about 22 mm and an entire length of about 250 mm, for example.

Connection portions 100a and 100b for mechanical connection are formed at both ends of the piston rod 100. In the piston rod 100, an outer circumferential surface 100d of a main shaft 100c between the connection portions 100a and 100b slidably contacts with the sealing member. The outer circumferential surface 100d of the main shaft 100c is an inspection target. The connection portions 100a and 100b at both ends are not subjected to the inspection target. The connection portion 100a is connected to the unsprung mass of the vehicle and the piston 207 is fitted on the connection portion 100b by the nut 206.

Figure 4:
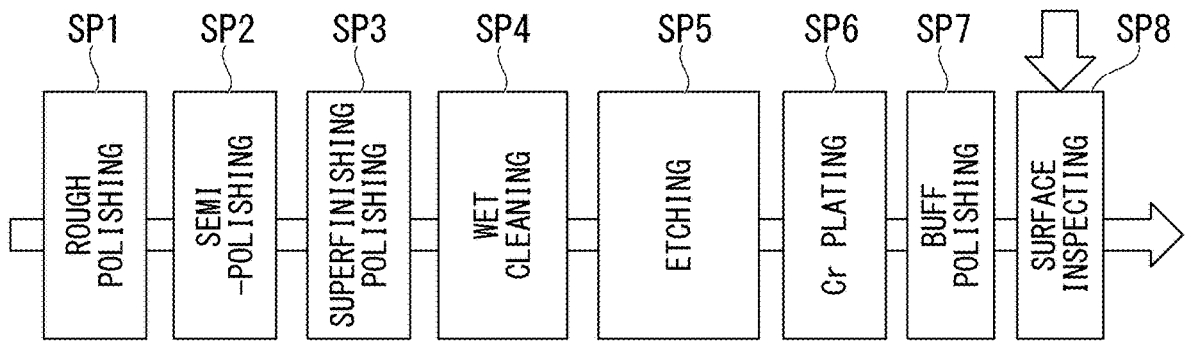
FIG. 4 is a diagram illustrating a process of manufacturing the piston rod which is the measurement target according to the first embodiment.

The piston rod 100 is manufactured by performing a cutting process and a heating process in that order, and then, as illustrated in FIG. 4, performing a rough polishing process SP1, a semi-polishing process SP2, a superfinishing polishing process SP3, a wet cleaning process SP4, an etching process SP5, a chrome plating process SP6, a buff polishing process SP7, and a surface inspecting process SP8 in that order. The rough polishing process SP1, the semi-polishing process SP2, the superfinishing polishing process SP3, the wet cleaning process SP4, the etching process SP5, the chrome plating process SP6, the buff polishing process SP7, and the surface inspecting process SP8 are all performed on the outer circumferential surface 100d of the main shaft 100c. The buff polishing process SP7 is mirror surface processing to form the outer circumferential surface 100d of the main shaft 100c with a mirror-finished surface, in other words, a glossy condition. Further, in other words, the buff polishing process SP7 is a working process of performing mirror surface processing on the outer circumferential surface 100d of the main shaft 100c. The surface inspecting process SP8 is an inspecting process of inspecting the outer circumferential surface 100d of the piston rod 100 that has the outer circumferential surface 100d with a mirror-finished surface.

Figure 5:
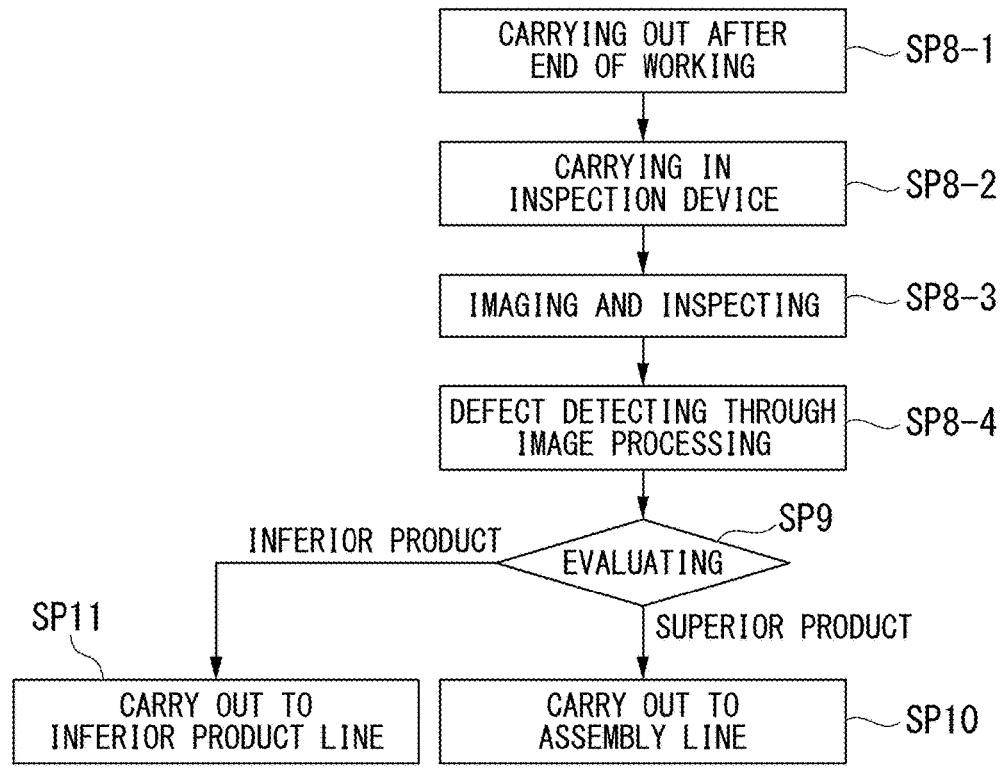
FIG. 5 is a flowchart illustrating a process of inspecting the surface of the piston rod which is the measurement target according to the first embodiment.
Figure 6:
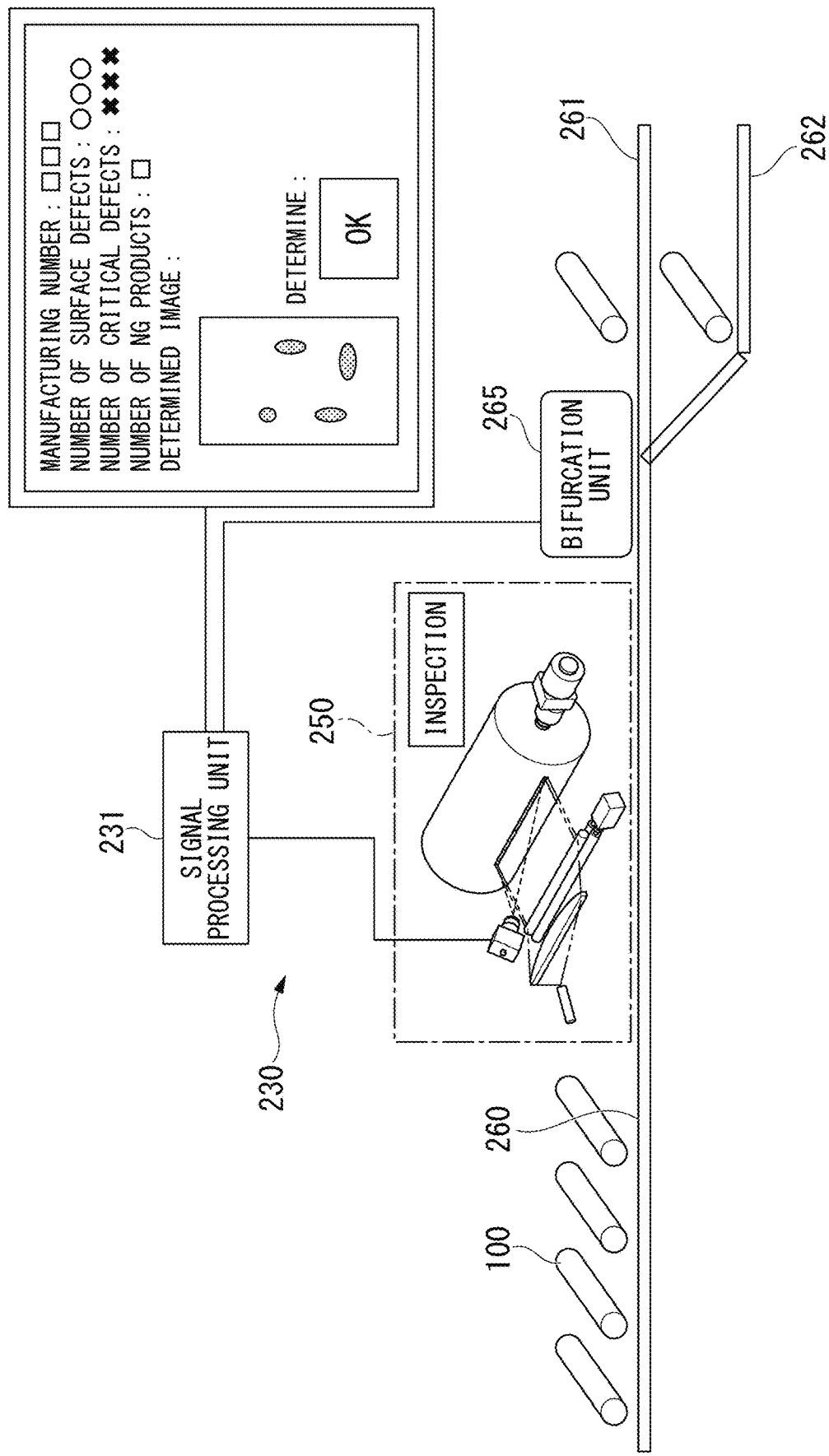
FIG. 6 is a diagram illustrating an inspection device and a transport device including a measurement device according to the first embodiment.

In the surface inspecting process SP8, as illustrated in FIG. 5, after the working process from the rough polishing process SP1 to the buff polishing process SP7 ends, a carrying-out process SP8-1 after end of the working is performed to carry out the piston rod 100. And then, an inspection device carrying-in process SP8-2 of carrying into an inspection device 230 illustrated in FIG. 6 is performed. In the surface inspecting process SP8, the inspection device 230 performs an imaging and inspecting process SP8-3 of inspecting the piston rod 100 using a measurement device 250 by setting the outer circumferential surface 100d of the main shaft 100c of the piston rod 100 as a measurement surface and performs imaging and measuring of the outer circumferential surface 100d. And then, a defect detecting process SP8-4 of detecting a defect of the outer circumferential surface 100d of the piston rod 100 through image processing is performed. In the main shaft 100c, the outer circumferential surface 100d which is a measurement surface is a cylindrical surface. Accordingly, the measurement surface is a protruding shape protruding outside.

Figure 7:
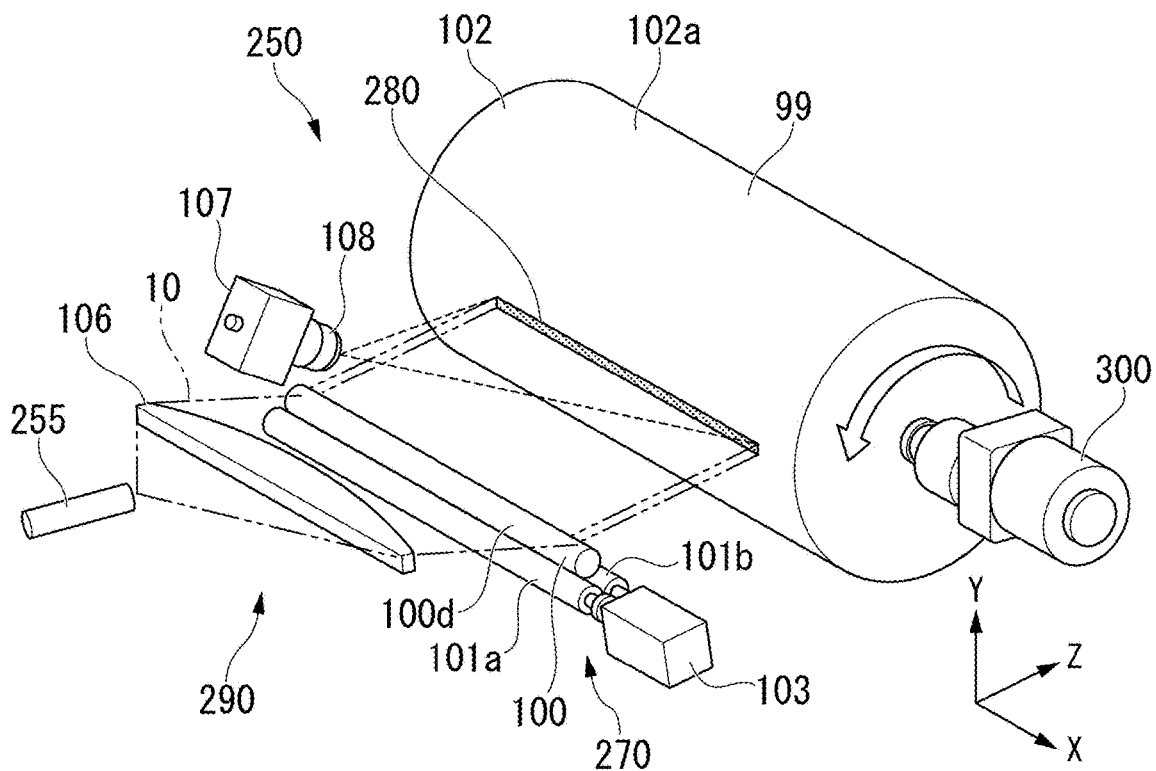
FIG. 7 is a perspective view illustrating the measurement device according to the first embodiment.
Figure 8:
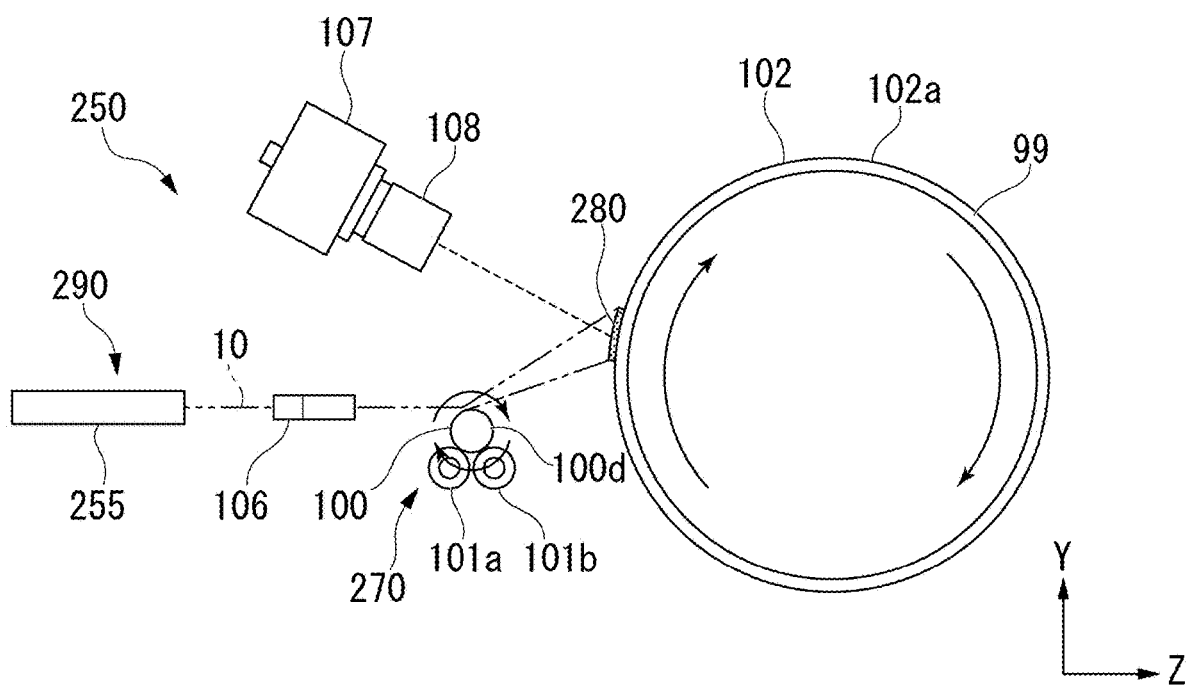
FIG. 8 is a side view illustrating the measurement device according to the first embodiment.

As illustrated in FIGS. 7 and 8, the measurement device 250 that measures the outer circumferential surface 100d of the piston rod 100 which is a measurement target component includes a laser slit light source 255 that widens a light beam in a slit shape, a cylindrical lens 106, rollers 101a and 101b that rotate the piston rod 100, a line sensor camera 107 (an optical sensor), and a screen 102. In both the rollers 101a and 101b, the outer circumferential surface is a cylindrical surface. The rollers 101a and 101b are supported to be rotatable about central axes of the cylindrical shapes of the outer circumferential surfaces, the central axes being disposed parallel to each other.

The piston rod 100 is carried out in the carrying-out process SP8-1 after end of the working illustrated in FIG. 5 after the buff polishing process S7 illustrated in FIG. 4, is transported by a transport device 260 illustrated in FIG. 6 and is carried in the inspection device 230 in the inspection device carrying-in process SP8-2 illustrated in FIG. 5. The piston rod 100 carried in the inspection device 230 is mounted across the rollers 101a and 101b of the measurement device 250.

Figure 9:
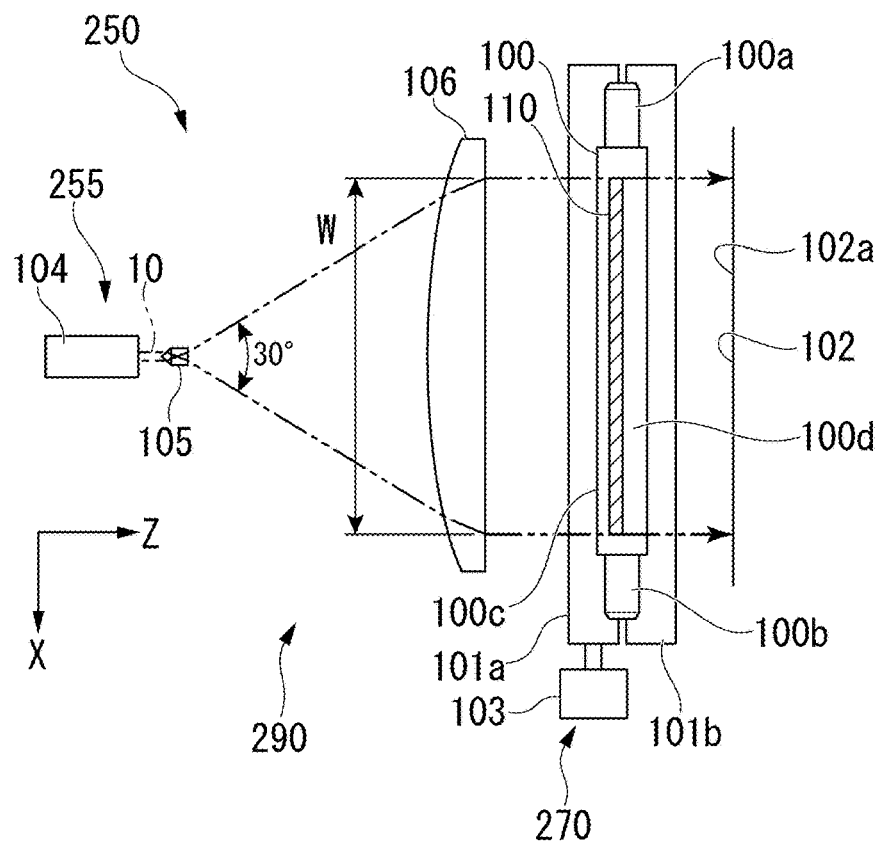
FIG. 9 is a plan view illustrating the measurement device according to the first embodiment.
Figure 10:
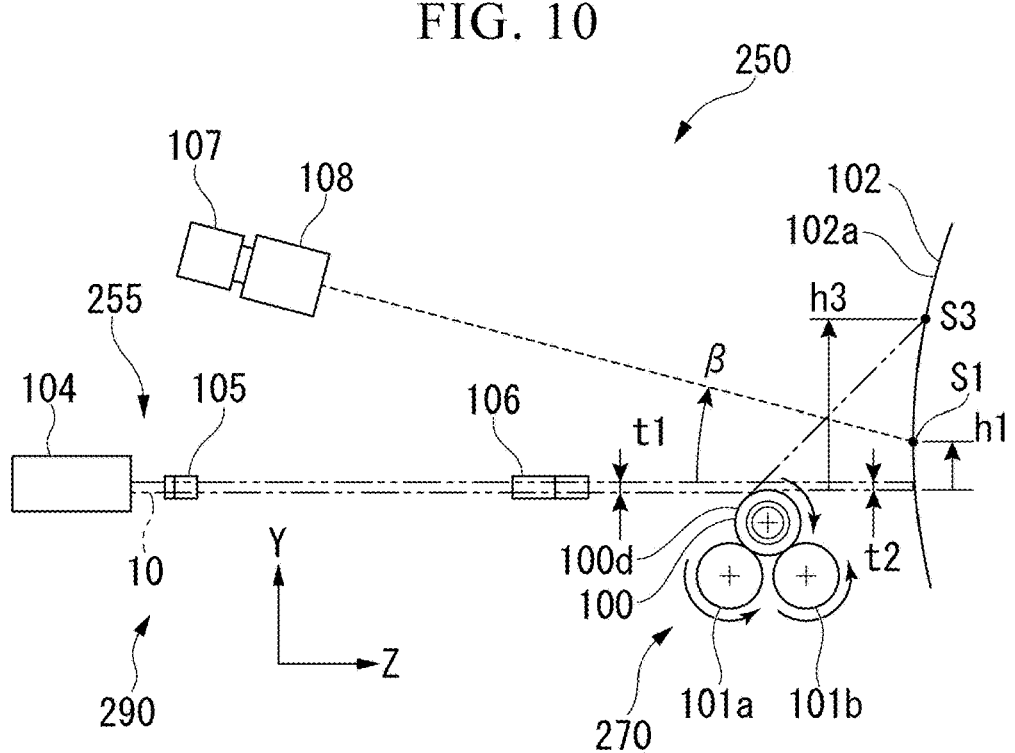
FIG. 10 is a side view illustrating main units of the measurement device according to the first embodiment.

As illustrated in FIGS. 9 and 10, the rollers 101a and 101b have the same diameter. The rollers 101a and 101b are disposed to be separate in the horizontal Z direction orthogonal to the X axis at the same height position in the Y direction which is the height direction in a state in which shaft centers are parallel to the horizontal X axis. The piston rod 100 is mounted on the rollers 101a and 101b so that the shaft centers are disposed on a central line of a boundary between the rollers 101a and 101b.

As illustrated in FIGS. 7 and 9, the roller 101a is connected to a roller driving motor 103. The roller 101b can be freely rotated about the shaft center. When the roller driving motor 103 is rotatably driven, the roller 101a rotates and the piston rod 100 and the roller 101b rotate. That is, by controlling rotation of the roller driving motor 103, rotation of the piston rod 100 can be controlled at any speed. The roller driving motor 103 and the rollers 101a and 101b serve as a movement unit 270 that moves the outer circumferential surface 100d by rotating the piston rod 100 which is an inspection target component. Although not illustrated, the movement unit 270 including the rollers 101a and 101b is mounted on a movement stage to be movable integrally in the vertical direction (the Y direction).

As illustrated in FIGS. 9 and 10, the laser slit light source 255 includes a Powell lens 105 and a laser oscillator 104 which is a coherent light source radiating laser light (irradiation light) to the piston rod 100. The laser oscillator 104 outputs, for example, a laser beam with a wavelength 670 nm and a diameter of 2 mm, that is, a coherent light beam (also referred to as "irradiation light") 10. The laser oscillator 104 has an output of, for example, about 100 mW. The light beam 10 output from the laser oscillator 104 can be widened in a fan shape only on the XZ plane, that is, only the horizontal plane, by the Powell lens 105. The Powell lens 105 is a cylindrical lens that has a round ridge. The Powell lens 105 is also referred to as a laser line generator lens. The Powell lens 105 expands the light beam 10 having the diameter of 2 mm from the laser oscillator 104 to a full angle of 30°, for example.

The laser oscillator 104 is a single mode laser, an intensity distribution of an output beam is a Gaussian distribution, and a $1/e^2$ diameter is referred to as a beam diameter. That is, the beam diameter has a width at the intensity when a peak intensity value drops to $1/e^2$ (13.6%).

The cylindrical lens 106 has a curvature only in the XZ plane, as illustrated in FIG. 9. The cylindrical lens 106 acts as a convex lens in the horizontal direction and does not act as a lens in the vertical direction. The cylindrical lens 106 forms the light beam 10 radiated from the laser oscillator 104 to the light beam 10 having a slit shape with a predetermined width (a length in the X direction) W×a predetermined thickness (a length in the Y direction, that is, a height) t1. For example, the cylindrical lens 106 that has a focal distance of 400 mm is used to form the light beam 10 with the width W=200 mm and the thickness t1=2 mm by adjusting an interval between the Powell lens 105 and the cylindrical lens 106 to about 400 mm. The outer circumferential surface 100d of the piston rod 100 is irradiated with the light beam 10 formed by the cylindrical lens 106 in a slit shape, in other words, a belt-like shape. The light beam 10 formed by the cylindrical lens 106 spreads parallel to the central axis of the piston rod 100, and is radiated to the protruding outer circumferential surface 100d of the piston rod 100 in the tangential direction of the vertex of the outer circumferential surface 100d.

The laser oscillator 104, the Powell lens 105, and the cylindrical lens 106 are included in an irradiation unit 290 that forms the light beam 10 in the slit shape with the predetermined width W×the predetermined thickness t1 and radiates the light beam 10 to the outer circumferential surface 100d which is a measurement surface of the piston rod 100. The movement unit 270 relatively moves the light beam 10 radiated from the irradiation unit 290 and the outer circumferential surface 100d of the piston rod 100 which is a measurement surface.

In FIG. 9, an irradiation region 110 of irradiation light 10 radiated to the outer circumferential surface 100d of the piston rod 100 via the cylindrical lens 106 is indicated by oblique hatching. The irradiation light 10 is reflected from the outer circumferential surface 100d which is a measurement surface of the piston rod 100 and is projected to the screen 102. The reflected light reflected from the outer circumferential surface 100d which is a protruding curved surface of the piston rod 100 is expanded by the outer circumferential surface 100d and is projected to the screen 102 to from an optical image 280 on the screen 102, as illustrated in FIGS. 7 and 8. That is, the light beam 10 from the irradiation unit 290 is radiated in the tangential direction of the vertex point of the protruding outer circumferential surface 100d of the piston rod 100 and the reflected light reflected from the protruding outer circumferential surface 100d is projected to the screen 102 to form the optical image 280. The X direction is the width direction of the optical image 280. The optical image 280 linearly extends in the X axis direction orthogonal to the Y direction which is a movement direction of the outer circumferential surface 102a during rotation of the screen 102 and the entire optical image 280 is projected to the outer circumferential surface 102a of the screen 102.

The screen 102 is disposed to be separate from the piston rod 100 on the opposite side to the laser slit light source 255 of the piston rod 100 in the Z direction. The reflected light reflected from the outer circumferential surface 100d of the piston rod 100 is projected to the screen 102, and thus the optical image 280 is formed from the reflected light. As illustrated in FIG. 7, the measurement device 250 includes the screen 102 and a screen driving motor 300 (a driving source) that drives the screen 102.

The screen 102 has a cylindrical shape, as illustrated in FIGS. 7 and 8. In other words, the outer circumferential surface 102a is a cylindrical surface. The screen 102 is disposed so that the central axis line of the cylindrical shape of the outer circumferential surface 102a is parallel to the X axis. The screen 102 is supported to be rotatable about the central axis line. In the screen 102, the cylindrical outer circumferential surface 102a is configured as a Lambertian scatter 99 (a scattering reflector) coated as a scattering reflection surface. The reflection surface 99 of the Lambertian scatter is formed of, for example, polytetrafluoroethylene (PTFE) coated or foamed-resin molded with barium sulfate.

The screen driving motor 300 rotates the screen 102 about the central axis line of the screen 102. The screen driving motor 300 rotates the screen 102 to move the outer circumferential surface 102a of the screen 102 with respect to the optical image 280 projected to a fixed position in the X and Y directions on the screen 102. In other words, the screen driving motor 300 moves a portion in which the optical image 280 is formed on the screen 102 in the Y direction with the X direction being fixed.

The optical image 280 formed by the reflected light expanded and projected to the screen 102 is captured and observed by the line sensor camera 107 via a TV camera lens 108. The line sensor camera 107 captures the optical image 280 formed on the screen 102 in a straight line shape parallel to the X axis in synchronization with driving of the roller driving motor 103. The TV camera lens 108 and the line sensor camera 107 are disposed coaxially and is disposed at an angle of elevation β with respect to an optical surface on which the laser oscillator 104, the Powell lens 105, and the cylindrical lens 106 are linearly arranged, as illustrated in FIG. 10. In the embodiment, the angle of elevation β of the line sensor camera 107 is set to 30°.

The optical surface of the laser oscillator 104 and the line sensor camera 107 are disposed to have the angle of elevation with regard to an imaging target S1 on the screen 102, and thus the reflected light of the piston rod 100 is received on the screen 102 on the front side.

The Lambertian scatter coated as the scattering reflection surface is coated on the screen 102, which is configured to enable imaging even when the line sensor camera 107 does not receive the reflected light of the piston rod 100 on the screen 102 on the front side. When the reflected light of the piston rod 100 is received from the front side, imaging is enabled despite even the screen 102 that does not have the scattering refection surface.

Here, when laser light is incident on a surface which is a general unsmoothed surface, part of the laser light is specularly reflected from the surface, but the remaining laser light scatters and is reflected. Accordingly, when the outer circumferential surface 102a of the screen 102 is set as a surface which is a general unsmoothed surface, luminance varies due to an imaging angle of the line sensor camera 107. In reflection from the Lambertian scatter 99, that is, the Lambertian reflection, outgoing light is evenly reflected omnidirectionally irrespective of an angle of incidence. Accordingly, apparent lightness (luminance) of the outer circumferential surface 102a of the screen 102 which is a reflection surface of the light beam 10 becomes constant even when the line sensor camera 107 performs imaging in any direction.

Figure 11:
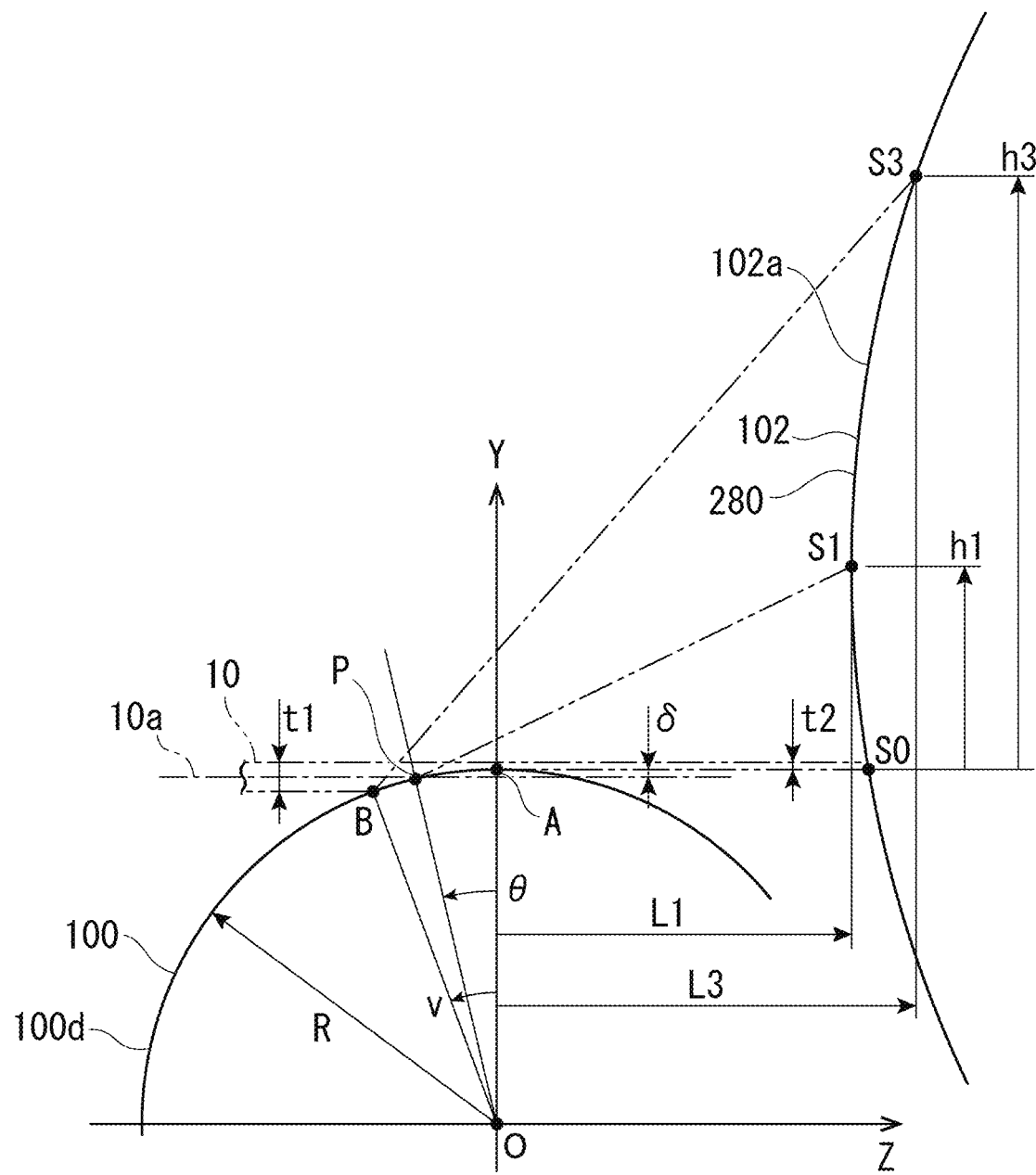
FIG. 11 is an enlarged view illustrating an optical image in a state in which the surface of the piston rod which is the measurement target is irradiated with irradiation light according to the first embodiment.

FIG. 11 is an enlarged view illustrating the optical image 280 in a state in which the outer circumferential surface 100d of the piston rod 100 which is the measurement target is irradiated with the irradiation light. A positional relation between a visual field of the line sensor camera 107 on the screen 102 and the reflected light from the outer circumferential surface 100d of the piston rod 100 will be described with reference to FIG. 11.

In the embodiment, an angle of illumination incidence u1 at the specific position P on the outer circumferential surface 100d of the piston rod 100 is set to 87°. Accordingly, θ in FIG. 11 is 3°. The rollers 101a and 101b of the movement unit 270 on which the piston rod 100 is mounted are movable in the vertical direction by a movement stage (not illustrated), as described above. Based on a pre-decided inspection recipe, the piston rod 100 is moved in the vertical direction by the movement stage to exactly match the height of the vertex A (one side edge) of the uppermost portion of the piston rod 100 to the height of an optical axis 10a of the light beam 10 having the thickness t1. From this state, the piston rod 100 is raised in the Y direction so that the optical axis 10a of the light beam 10 is matched to the specific position P. When a movement amount of the piston rod 100, in other words, the height from the specific position P to the vertex A in the Y direction, is δ, δ=R(1−cos θ) is satisfied in FIG. 11. The diameter of the piston rod 100 is 22 mm. Accordingly, because of a radius R=11 mm and θ=3°, δ=0.015 mm is obtained.

Here, the thickness t2 of the irradiation light 10 directly radiated to the screen 102 without being radiated to the piston rod 100 is obtained by t1/2−δ. Because of t1=2 mm, t2=0.985 is obtained. When v is an angle from the Y axis with respect to an illumination incidence point B at which the outer circumferential surface 100d of the piston rod 100 is irradiated with a light ray of the bottom surface of the light beam 10 having the thickness t1, cos(v)=(R−(t1/2+δ))/R is obtained. From this relational expression, the angle V is 24.8°.

When an interval L3 between a central axis O of the piston rod 100 and a point S3 on the screen 102 is 50 mm, a height h3 at which the light ray reflected at the illumination incidence point B reaches the point S3 on the screen 102 can be obtained by substituting L1 in Expression (1) with a distance L3 between the central axis O of the piston rod 100 and the point S3 in the Z direction and substituting φ1 with v, and h3=63.16 mm is obtained. Because of θ=3°, h1=6.3 mm is obtained by Expression (1) when the light ray reflected at the specific position P reaches the point S1 on the screen 102 assuming the interval L1 between the central axis O of the piston rod 100 and the point S1 on the screen 102 as 60 mm. When the magnification M in the circumferential direction of the outer circumferential surface 100d of the piston rod 100 at S1 is calculated by Expression (3), M=10.02 is obtained.

Figure 12:
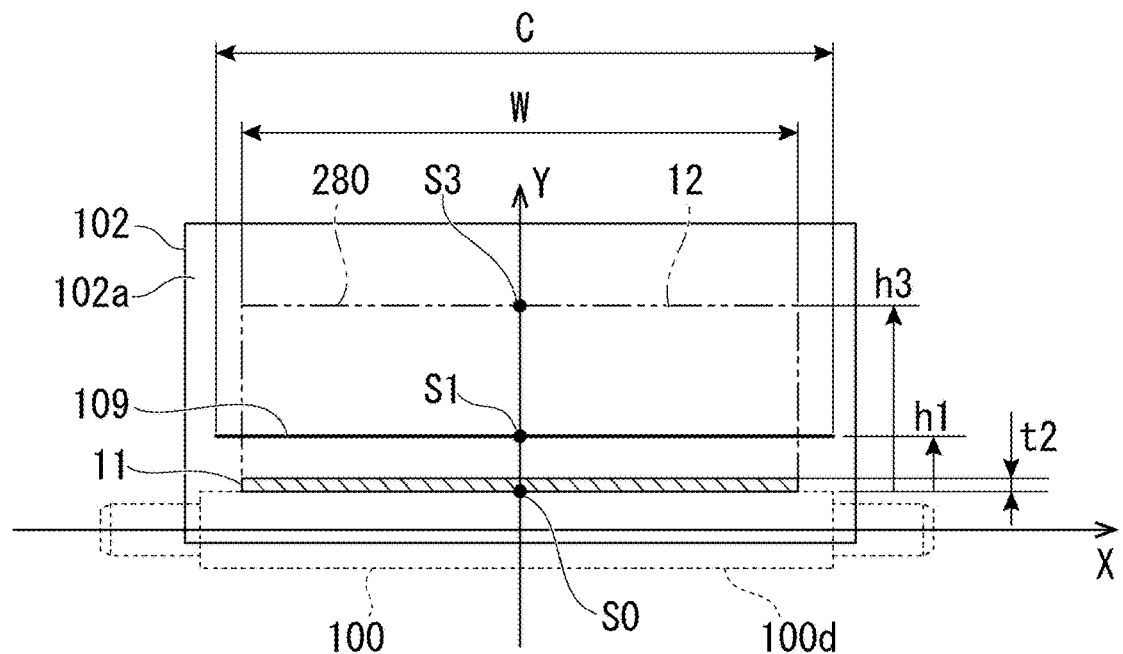
FIG. 12 is a front view illustrating an observation position of the optical image on the screen from the side of a laser oscillator according to the first embodiment.

FIG. 12 is a front view illustrating an observation position of the optical image 280 on the screen 102 when viewed from the side of the laser oscillator 104.

The dimensions of the screen 102 are, for example, a radius of 215 mm×a width of 480 mm. A light flux reflected from the outer circumferential surface 100d of the piston rod 100 is projected to a projection region 12 with a width W=200 mm×a height h3=63.16 mm indicated by a two-dot chain line. The optical image 280 is formed in the projection region 12. Here, the projection region 12 includes a direct illumination range 11 serving as a reference image formed by reference light of the irradiation light 10 which is not radiated to the piston rod 100. That is, of the light beam 10 with the thickness t1, a light flux with the thickness t2 of a part of region above the vertex A of the piston rod 100 serves as reference light that passes on the protruding outer circumferential surface 100d of the piston rod 100 and is directly projected to the direct illumination range 11 of the screen 102 to form a reference image in the direct illumination range 11. A visual field position 109 of the line sensor camera 107 is adjusted to the height of h1 using the point S0 which is a lower end position of the reference light on the screen 102 as a reference position. In the embodiment, h1=6.3 mm is obtained. In the surface inspecting process SP8, a surface state of the outer circumferential surface 100d of the piston rod 100 is inspected based on a reflected light intensity distribution which is a distribution of an inspection location of the optical image 280 specified by the reference light and which is detected by the line sensor camera 107.

The line sensor camera 107 has 4096 pixels and an element dimension c of one pixel has a square of 5.5 μm. This is magnified ten times in the TV camera lens 108 and is disposed to be conjugated with the screen 102. The element dimension c of one pixel of the line sensor camera 107 on the screen 102 is 55 μm. From this condition, a visual field length C of the line sensor camera 107 is 225 mm and includes the width W=200 mm of the projection region of the reflected light.

An inspection time in which the roller driving motor 103 is rotatably driven to rotate the piston rod 100 once and the entire range of the piston rod 100 in the circumferential direction is observed will be described. When c is the element dimension of one pixel of the line sensor camera 107 on the screen 102 and f is a line rate, a maximum value of an angular velocity N of rotation for inspecting the entire range in the circumferential direction of the outer circumferential surface 100d of the piston rod 100 can be obtained by Expression (5) from the radius R of the piston rod 100 and the magnification M on the screen 102.

$$N \leq c \cdot f / (2\pi R \cdot M) \quad (5)$$

Here, when c=0.055 mm, f=5 kHz, R=11 mm, and M=10 times, N≤0.39 rps is obtained. When a reciprocal of this is taken, an inspection time per sample is about 2.56 sec/unit.

The above description has been made setting the radius R of the piston rod 100 to 11 mm, but the piston rod 100 with another diameter can also be inspected in accordance with the same method. For example, a case in which a sample with R=14 mm is inspected under the condition that the illuminance incidence angle on the outer circumferential surface 100d which is an inspected surface is 87° will be described below.

In FIG. 11, δ=R(1−cos θ) is obtained. Since the position θ=3° of the specific position P is the same and R=14 mm is set, δ=0.019 mm is obtained. Here, the thickness t2 of the irradiation light 10 directly radiated to the screen 102 without being radiated to the piston rod 100, t1/2−δ is obtained. Because of t1=2 mm, t2=0.981 mm is obtained. An angle v of the illumination incidence point B of the outer circumference of the piston rod 100 is 22.0° from the relational expression of cos(v)=(R−(t1/2+δ))/R. An interval L3 between the central axis O of rotation of the piston rod 100 and the point S3 on the screen 102 is 50 mm. When the light ray reflected at the illumination incidence point B reaches the point S3 on the screen 102, φ1 of Expression (1) is substituted with v to obtain h3=52.33 mm. Similarly, because of θ=3°, the interval L1 between the central axis O of rotation of the piston rod 100 and the point S1 on the outer circumferential surface 102a of the screen 102 is 5.31 mm when the light ray reflected at the specific position P reaches the point S1 on the outer circumferential surface 102a of the screen 102. From Expression (1), h1=5.1 mm is obtained. When the magnification M of the outer circumferential surface 100d of the piston rod 100 at S1 is calculated by Expression (3), M=10.26 is obtained.

In FIG. 12, the light flux reflected from the outer circumferential surface 100d of the piston rod 100 is projected to the projection region 12 with a width W=200 mm×a height h3=52.33 mm indicated by a two-dot chain line. The visual field position 109 of the line sensor camera 107 is adjusted to the height of h1 using the point S0 on the screen 102 as a reference. In the case of the radius R=14 mm of the piston rod 100, h1=5.10 mm is obtained. In the piston rod 100 with the radius R=11 mm, h1=5.06 mm is obtained.

The pixel dimension c of the line sensor camera 107 on the screen 102 is 0.055 mm. Accordingly, a difference in h1 (0.04 mm) in the piston rod 100 between the foregoing two examples in which the radius R is different is smaller than the pixel dimension c of the line sensor camera 107 on the screen 102. Therefore, it is not necessary to change the visual field position 109 of the line sensor camera 107. That is, the surface defect inspection on the piston rod 100 with the radius R=11 mm and R=14 mm can be continuously performed without changing a setting position (a setting height) of the specific position P of the piston rod 100. It is normally determined that it is not necessary to change the setting position (the setting height) of the specific position P of the piston rod 100 as long as the difference in h1 is within the pixel dimension c of one pixel on the screen 102, although this differs depending on the pixel dimension c of the line sensor camera 107 or the state of the piston rod 100 to be observed.

An inspection time in which the roller driving motor 103 is driven to rotate the piston rod 100 once and the entire range of the piston rod 100 in the circumferential direction is observed will be described. When a scanning rate f of the line sensor camera 107 is 5 kHz, N≤0.30 rps is obtained by Expression (5) because of c=0.055 mm, R=14 mm, and M=10.26 times. When a reciprocal of this is taken, the inspection time per piston rod 100 is about 3.33 sec/unit. In the case of the radius R=11 mm of the piston rod 100, the inspection time is about 2.57 sec/unit. In the case of the inspection performed at a scanning rate f of the line sensor camera 107 which is constant, an inspection time varies in accordance with the diameter of the piston rod 100. Here, practically, both the cases can be considered to be substantially the same. The reason why the inspection time is substantially the same despite the expanded diameter of the piston rod 100 is a difference in the magnification M of the surface of the piston rod 100 on the screen 102. In the case of R=11 mm, the magnification M=10.26 times is obtained. However, in the case of R=14 mm, the magnification decreases to M=10.34 times.

Since the pixel dimension c of the line sensor camera 107 on the screen 102 is 0.055 mm, the optical image 280 projected to the screen 102 is equivalent to an observation of the circumferential direction of the piston rod 100 via the screen 102 at a spatial resolution of c/M. An observation resolution of the circumferential direction differs in accordance with the diameter of the piston rod 100, and the pixel dimension c of the optical image 280 obtained with the line sensor camera 107 is 4.22 μm in the case of R=11 m and is 5.36 μm in the case of R=14 mm.

An inspection time necessary to observe the entire range in the circumferential direction of the outer circumferential surface 100d of the piston rod 100 is about 3.33 sec/unit in the case of the radius R=11 mm of the piston rod 100 and is about 2.57 sec/unit in the case of the radius R=14 mm. However, in the cases of the radius R=11 mm and the radius R=14 mm of the piston rod 100, a different condition can be set so that the inspection times of both the cases are the same.

Hereinafter, the setting condition will be described. Here, the setting condition will be exemplified when the inspection time is 3 sec/unit.

In the case of the piston rod 100 that has the radius R=11 mm, the scanning rate f may be obtained as an unknown number in Expression (5) to end the inspection time at 3 sec/unit. A reciprocal of the inspection time 3 sec/unit is equivalent to an angular velocity. Therefore, when N=⅓ is substituted, a scanning rate f=4.19 kHz is obtained. In the case of the piston rod 100 that has a radius R=14 mm and N=⅓ is substituted in Expression (5), a scanning rate f=5.33 kHz is obtained. Accordingly, when the scanning rate f of the line sensor camera 107 is set to 4.19 kHz in the case of the piston rod 100 that has the radius R=11 mm and is set to 5.33 kHz in the case of the piston rod 100 that has the radius R=14 mm, the inspection of the entire range in the circumferential direction of the piston rod 100 can end at 3 sec/unit for each conditions. In this way, by changing the scanning rate f of the line sensor camera 107, the surface defect inspection of the piston rod 100 with a different diameter can be performed in the same tact.

The imaging and inspecting process SP8-3 includes an image forming process of irradiating the outer circumferential surface 100d of the piston rod 100 on the rollers 101a and 101b of the movement unit 270 with the light beam 10 from an oblique direction from the irradiation unit 290 and projecting the reflected light reflected from the outer circumferential surface 100d to the outer circumferential surface 102a of the screen 102 to form the optical image 280; and an imaging process of imaging the optical image 280 formed on the outer circumferential surface 102a of the screen 102 in the image forming process by the line sensor camera 107 in the measurement device 250. The image forming process and the imaging process are performed in parallel to measure the outer circumferential surface 100d of the piston rod 100.

Figure 13:
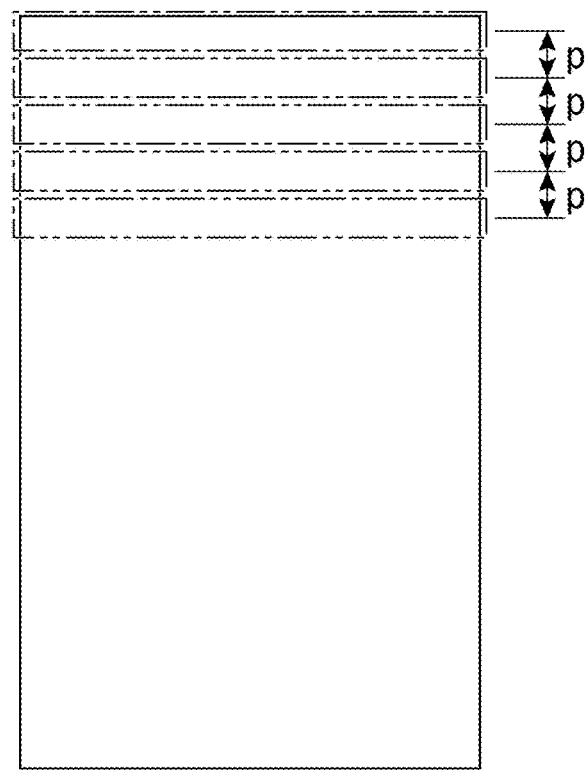
FIG. 13 is a front view illustrating scanning by a line sensor camera of the measurement device according to the first embodiment.

When the image forming process and the imaging process are performed in parallel in the imaging and inspecting process SP8-3, the measurement device 250 rotates the piston rod 100 by causing the roller driving motor 103 of the movement unit 270 to rotate the rollers 101a and 101b and rotate the piston rod 100, scans the outer circumferential surface 100d by relatively moving the light beam 10 radiated from the irradiation unit 290 and the outer circumferential surface 100d of the piston rod 100, and measures the entire range in the circumferential direction of the outer circumferential surface 100d. That is, the outer circumferential surface 100d is measured across the entire range in the circumferential direction by rotating the piston rod 100, as illustrated in FIG. 8, and sequentially causing the line sensor camera 107 to measure the outer circumferential surface 100d of the piston rod 100 at a predetermined scanning interval p in the circumferential direction, as illustrated in FIG. 13.

In the imaging and inspecting process SP8-3, the measurement device 250 causes the screen driving motor 300 to continuously rotate the cylindrical screen 102 at a constant speed in one direction in parallel with the rotation of the rollers 101a and 101b. As a result, the outer circumferential surface 102a of the screen 102 continuously moves in one direction. That is, when the optical image 280 is formed on the screen 102 and is captured by the line sensor camera 107, the screen driving motor 300 continuously moves the outer circumferential surface 102a of the screen 102 in one direction. Thus, on the screen 102, a portion in which the optical image 280 is shown on the outer circumferential surface 102a is continuously shifted in one direction with respect to the optical image 280 projected to a fixed position.

The screen 102 has a cylindrical shape of which the rotational axis extends in the X direction and the width direction of the optical image 280 of the screen 102 is the X direction. Therefore, the screen driving motor 300 continuously moves the screen 102 at a constant speed irrespective of a position of the optical image 280 in the width direction. In other words, the screen driving motor 300 continuously moves the screen 102 at the constant speed in the entire width of the optical image 280. Accordingly, the imaging process is performed with the screen 102 being continuously moved at the constant speed in one direction irrespective of the position of the optical image 280 in the width direction. On the screen 102, a portion in which the optical image 280 is shown is moved in a direction orthogonal to the width direction of the optical image 280.

In the imaging and inspecting process SP8-3, the inspection device 230 inspects the piston rod 100 by setting the outer circumferential surface 100d of the piston rod 100 as a measurement surface using the measurement device 250 and measuring the outer circumferential surface 102d. The outer circumferential surface 102d is a cylindrical surface.

Figure 14:
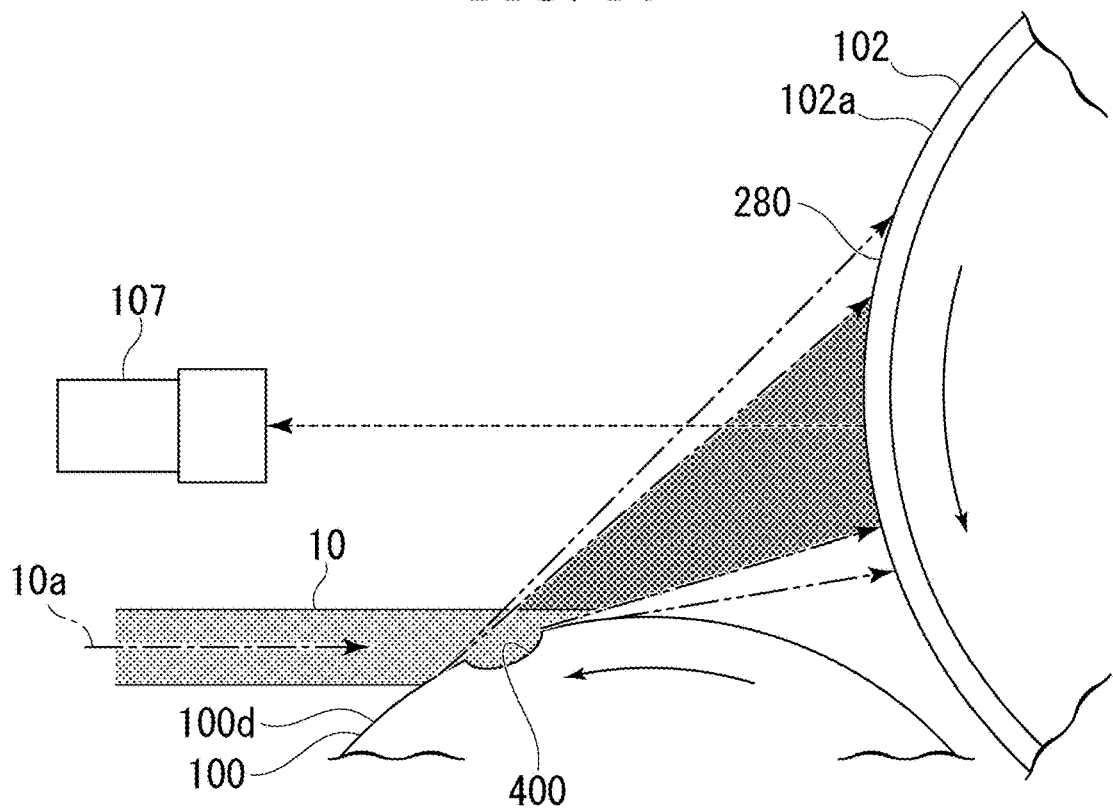
FIG. 14 is a side view illustrating a state in which the piston rod having a defect is inspected by the measurement device according to the first embodiment.

In the imaging and inspecting process SP8-3, as illustrated in FIG. 14, the outer circumferential surface 100d of the piston rod 100 is irradiated in an oblique direction with the light beam 10, the reflected light reflected from the outer circumferential surface 100d is projected to the screen 102 to form the optical image 280, and the optical image 280 is captured by the line sensor camera 107 which is an optical sensor. Then, an uneven state of the outer circumferential surface 100d of the piston rod 100 is determined from a reflected light intensity distribution of the optical image 280 projected to the screen 102. For example, a recessed defect 400 on the outer circumferential surface 100d illustrated in FIG. 14 is detected.

Figure 15:
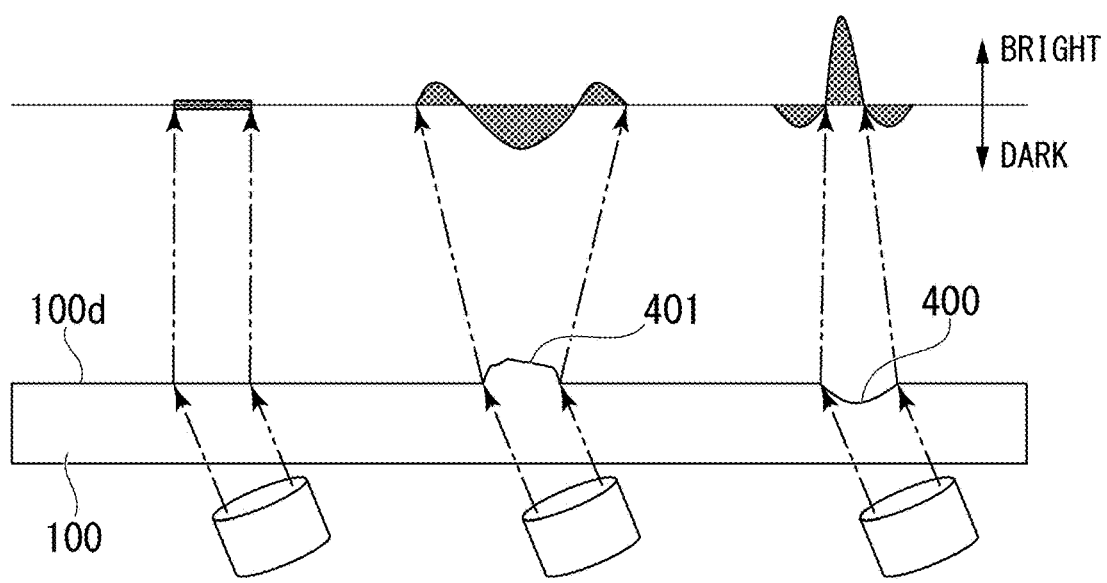
FIG. 15 is a diagram illustrating defect detection according to the first embodiment, where FIG. 15(a) illustrate a case in which there is no unevenness.

As illustrated in FIG. 15(a), when there is no unevenness on the outer circumferential surface 100d of the piston rod 100, light and shade do not occur in the optical image 280 on the screen 102. As illustrated in FIG. 15(b), when there is a protruding defect 401 on the outer circumferential surface 100d, reflected light at the edge of the protruding defect 401 becomes bright and reflected light in the middle of the protruding defect 401 becomes dark. As illustrated in FIG. 15(c), when there is a recessed defect 400 on the outer circumferential surface 100d, reflected light at the edge of the recessed defect 400 becomes dark and reflected light in the middle of the recessed defect 400 becomes bright. The uneven state of the outer circumferential surface 100d of the piston rod 100 is determined from the reflected light intensity distribution.

Figure 16:
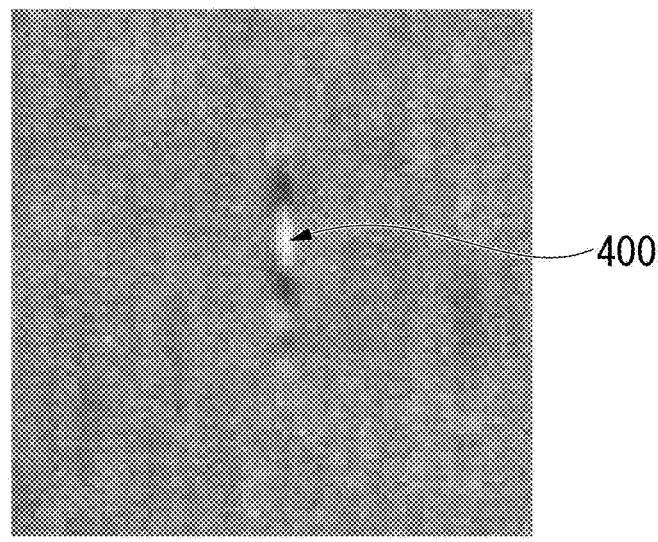
FIG. 16 is a diagram illustrating image data that shows an intensity distribution of reflected light with a recessed defect on the screen.
Figure 17:
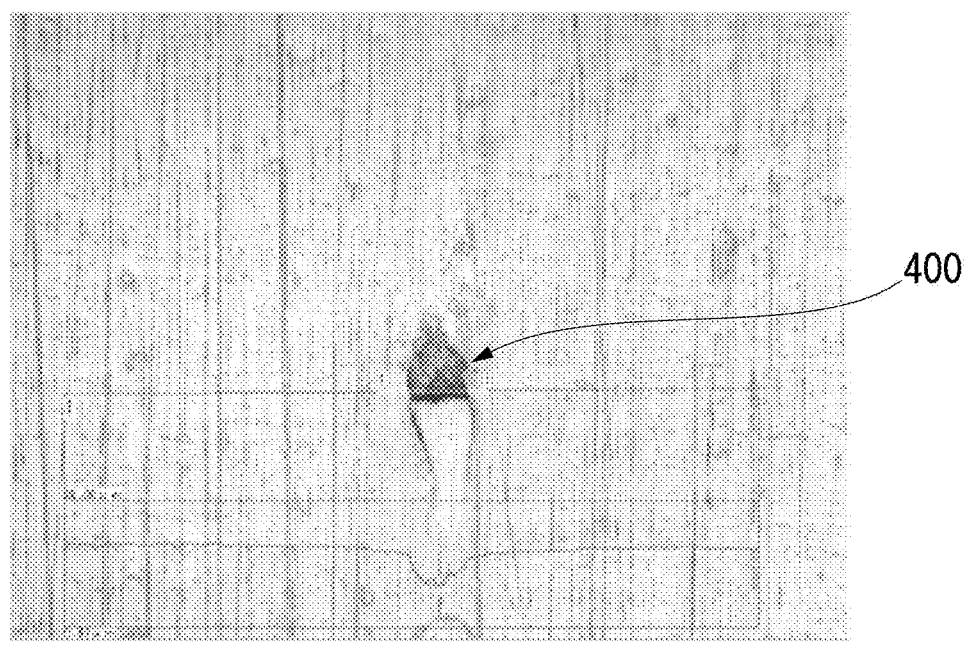
FIG. 17 is a diagram illustrating a microscopic image with the recessed defect in FIG. 16.
Figure 18:
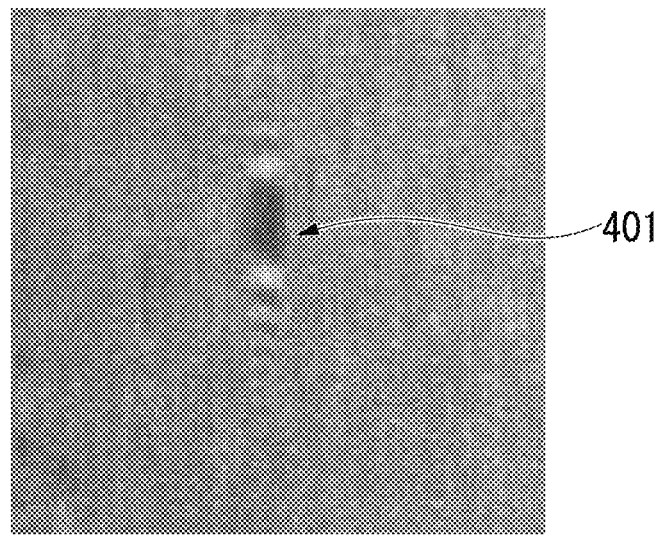
FIG. 18 is a diagram illustrating image data that shows an intensity distribution of reflected light with a protruding defect on the screen.
Figure 19:
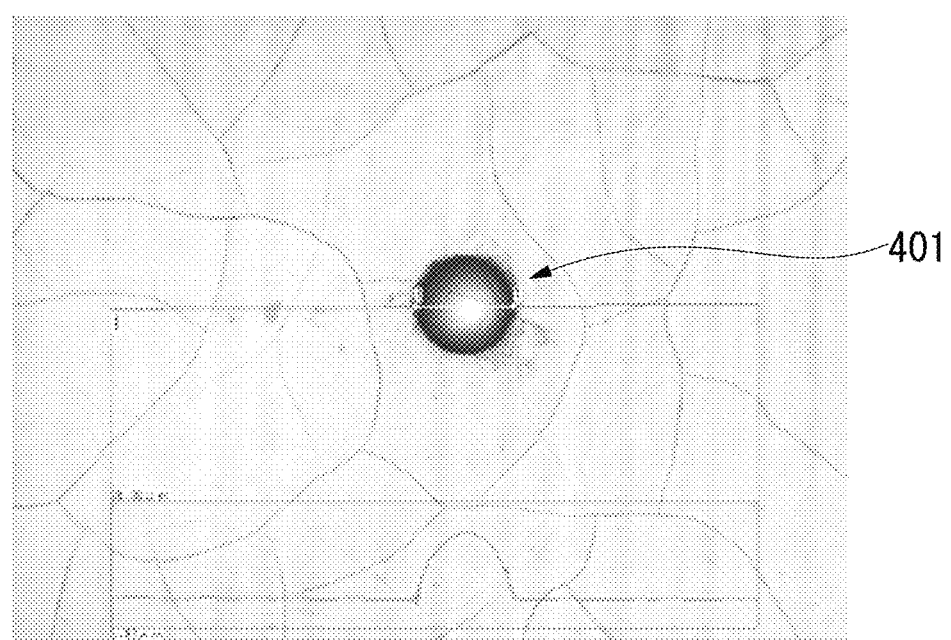
FIG. 19 is diagram illustrating a microscopic image with the protruding defect of FIG. 18.

FIG. 16 illustrates a reflected light intensity distribution obtained by causing the line sensor camera 107 to image the piston rod 100 having the recessed defect 400 caused due to buff peeling. FIG. 17 illustrates a microscopic image having the recessed defect 400 caused due to buff peeling of the piston rod 100. Further, FIG. 18 illustrates a reflected light intensity distribution obtained by causing the line sensor camera 107 to image the piston rod 100 that has the protruding defect 401 caused due to a granular protrusion. FIG. 19 illustrates a microscopic image that has the protruding defect 401 caused due to a granular protrusion on the piston rod 100.

Here, when the irradiation light source is a laser light source, a laser speckle occurs on the screen, and thus speckle noise may be included in image data captured by the line sensor camera 107.

The speckle noise occurs by that, when coherent light such as laser light is projected to the screen, light reflected from an unevenness of a screen surface overlaps and interferes with the projected light and is amplified. The speckle noise is observed as a bright spot or a bark spot in an image when imaging is performed by an optical sensor such as the line sensor camera 107. To remove the speckle noise, a screen is vibrated in a device disclosed in Patent Literature 1 described above. In a device disclosed in Patent Literature 2, a screen is oscillated.

Figure 20:
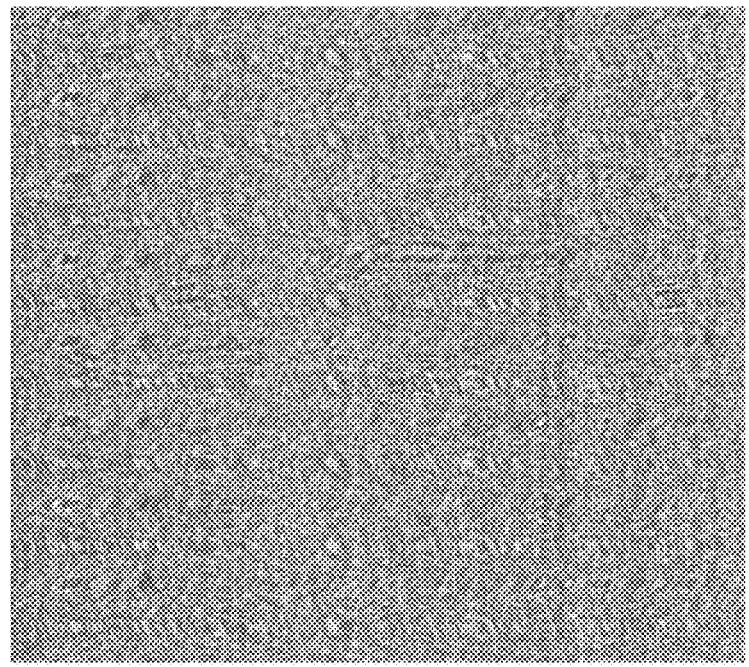
FIG. 20 is a diagram illustrating image data captured by the line sensor camera when the screen is vibrated.

When a screen is oscillated, speckle noise included in image data has a noise pattern with a periodic waveform, as illustrated in FIG. 20. Thus, it is difficult to remove the speckle noise through image processing.

Figure 21:
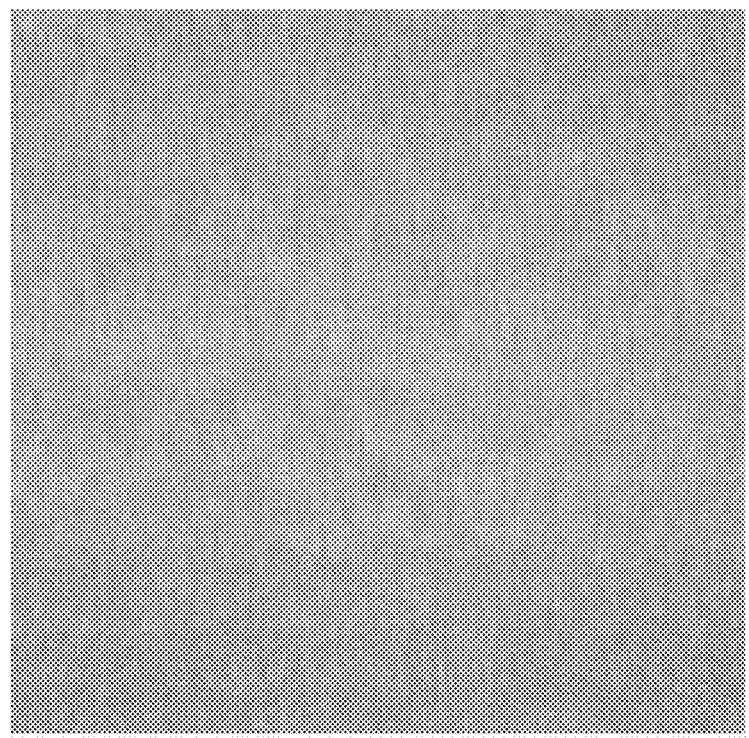
FIG. 21 is a diagram illustrating image data captured by the line sensor camera according to the first embodiment.

In contrast, when imaging is performed with the line sensor camera 107 with the screen 102 being continuously moved in one direction as in the first embodiment, it is easy to remove speckle noise through image processing. That is, when the screen 102 is continuously moved at a constant speed irrespective of a position of the optical image 280 in the width direction at the time of continuous movement of the screen 102 in one direction, the speckle noise included in the image data has a vertical stripe noise pattern, as illustrated in FIG. 21. Thus, it is further easy to remove the speckle noise through image processing.

Figure 22:
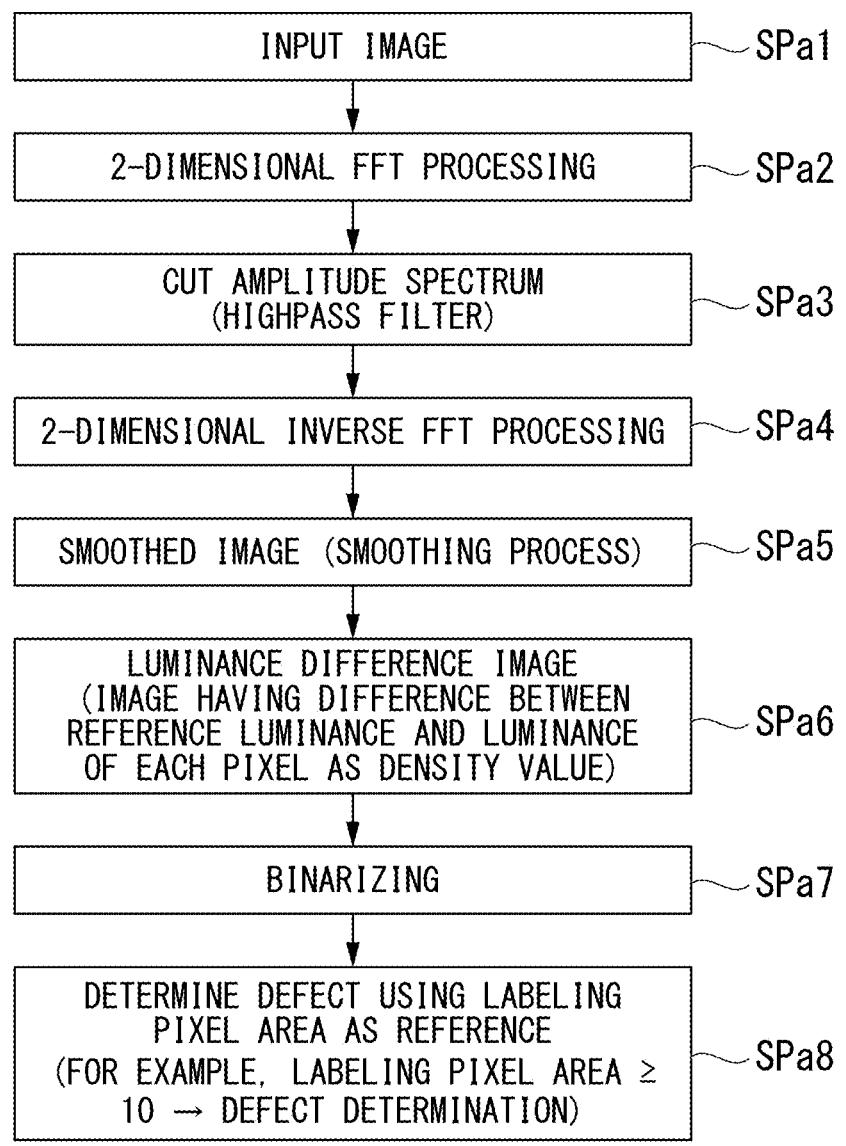
FIG. 22 is a diagram illustrating image processing according to the first embodiment.

After the imaging and inspecting process SP8-3, the defect detecting process SP8-4 is performed through image processing. In the image processing, as illustrated in FIG. 22, image data obtained by the line sensor camera 107 is first set as an input image (step SPa1). Subsequently, 2-dimensional FFT processing is performed on the input image to convert the image data into frequency domain data and an FFT image in which an amplitude spectrum is extracted is obtained (step SPa2). On the amplitude spectrum, a low-frequency component is focused on the center and a high-frequency component is located away from the center.

Subsequently, high-pass filter processing is performed on the amplitude spectrum by a highpass filter to cause the high-frequency component to remain and remove the low-frequency component (SPa3). As a result, background information of the low-frequency component disappears and it is possible to obtain a result in which only the contour of the high-frequency component is enhanced. Thereafter, 2-dimensional inverse FFT processing (2-dimensional inverse Fourier transform processing) is performed on the FFT image to return the frequency domain data to the image data, that is, a 2-dimensional image (step SPa4). Thus, it is possible to obtain an image in which only the contour of the input image remains. By using the foregoing highpass filter, it is possible to remove the noise pattern with a vertical stripe shape on the screen which is being rotated.

Figure 23:
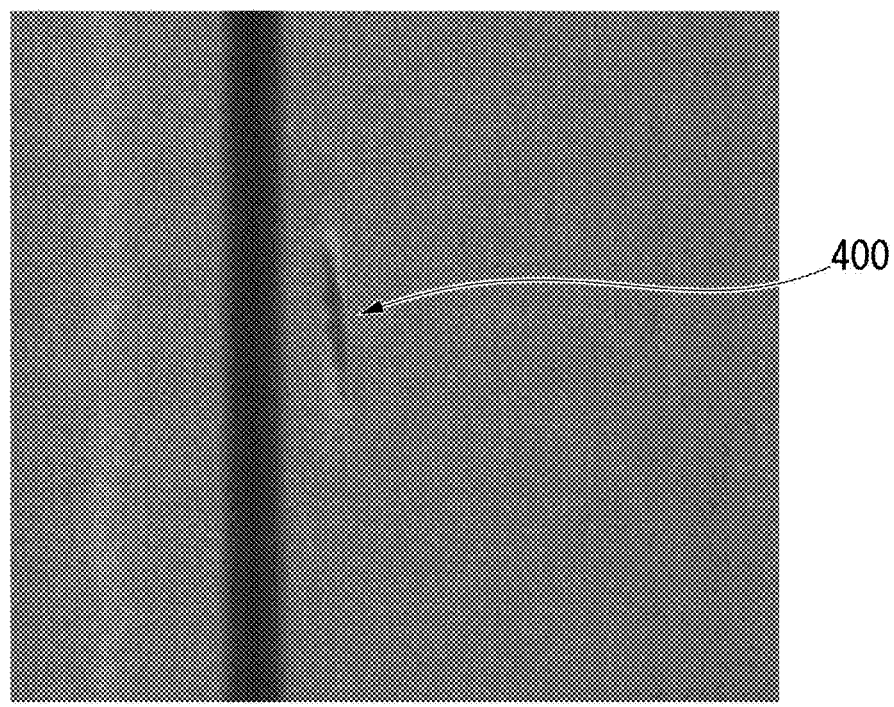
FIG. 23 is a diagram illustrating image data of an input image processed through the image processing according to the first embodiment.
Figure 24:
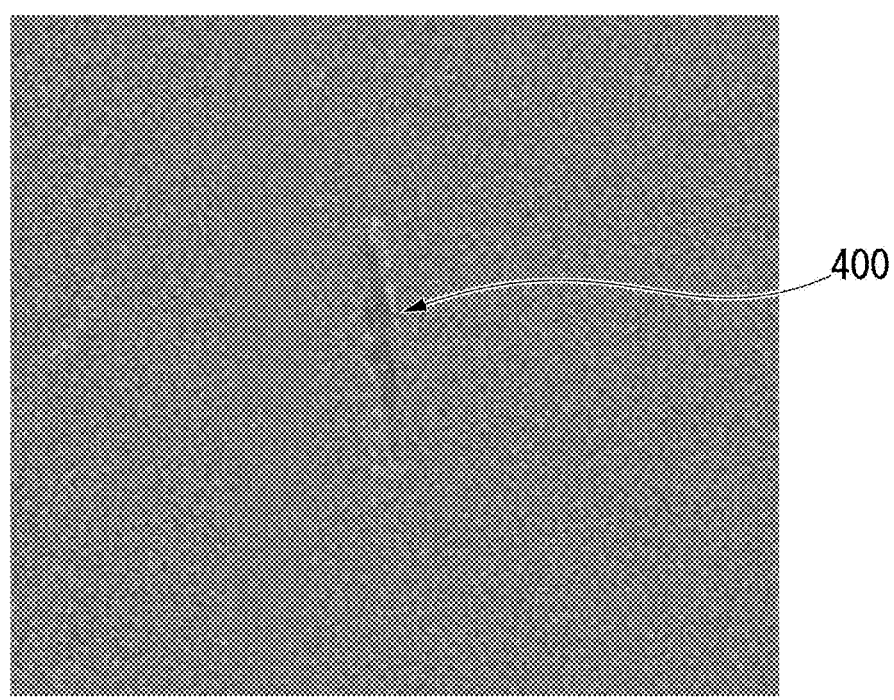
FIG. 24 is a diagram illustrating image data after highpass filter image processing of the image processing according to the first embodiment.

For example, as illustrated in FIG. 23, when the input image has the recessed defect 400 and has the vertical stripe noise, the 2-dimensional FFT processing, the highpass filter processing, and the 2-dimensional inverse FFT processing are performed. Then, as illustrated in FIG. 24, density information regarding periodic vertical stripe noise disappears, and thus it is possible to obtain a highpass filter image in which the contour of the defect 400 is enhanced.

Figure 25:
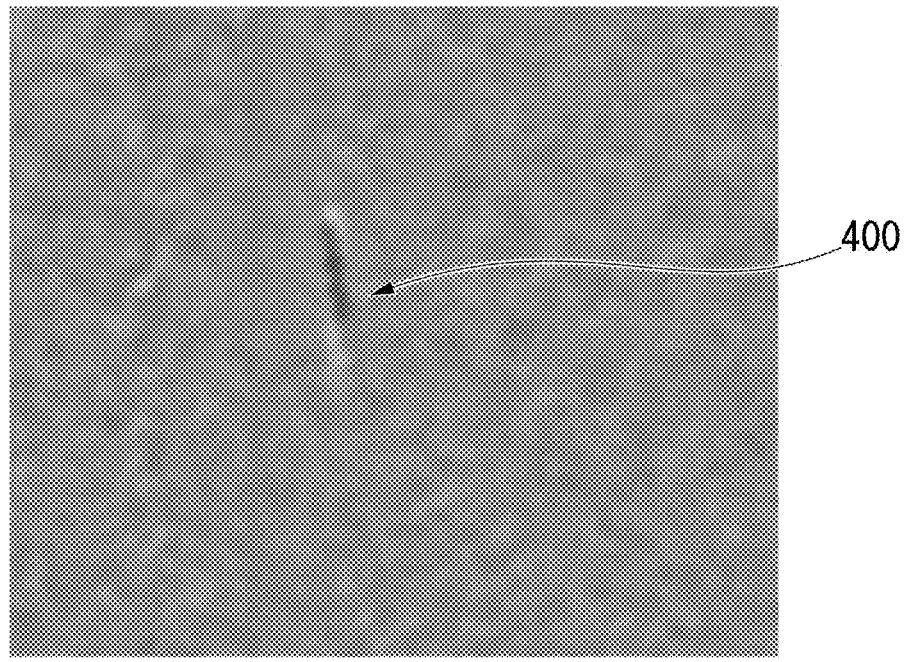
FIG. 25 is a diagram illustrating image data after smoothed image processing of the image processing according to the first embodiment.
Figure 26:
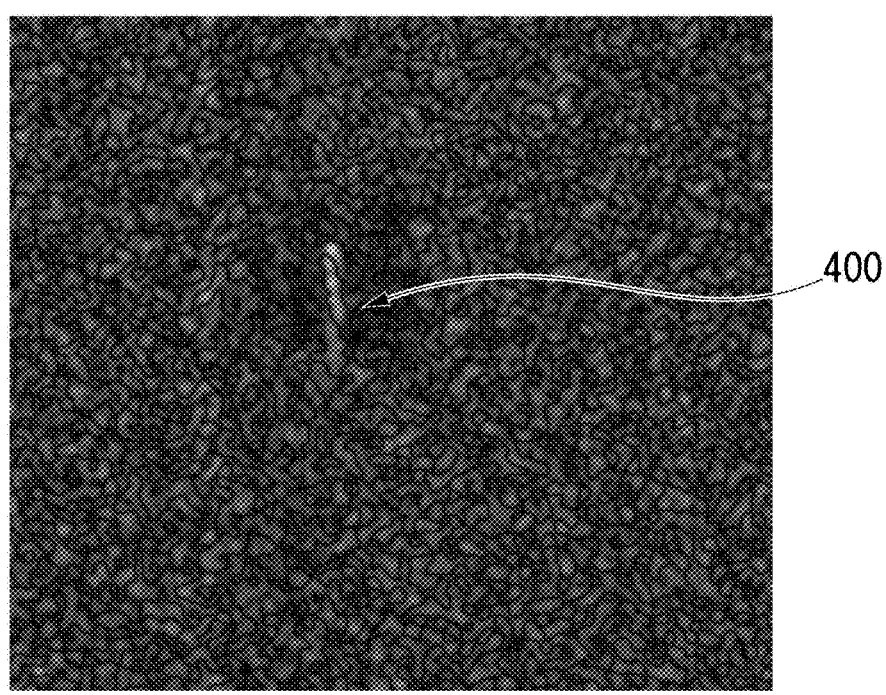
FIG. 26 is a diagram illustrating image data of a Mahalanobis image of the image processing according to the first embodiment.

Subsequently, a smoothing process is performed to reduce digital noise by a smoothing filter (step SPa5). Then, as illustrated in FIG. 25, a smoothed image from which the digital noise is reduced can be obtained from the highpass filter image illustrated in FIG. 24. Subsequently, reference luminance information of a pre-obtained pixel is compared to luminance of each pixel obtained from the smoothed image from which the digital noise is reduced, and an image that has a difference between the reference luminance and the luminance of each pixel as a density value (luminance difference image) is configured (step SPa6). FIG. 26 illustrates a luminance difference image of the smoothed image illustrated in FIG. 25.

Figure 27:
FIG. 27 is a diagram illustrating image data after a binarization process of the image processing according to the first embodiment.
Figure 28:
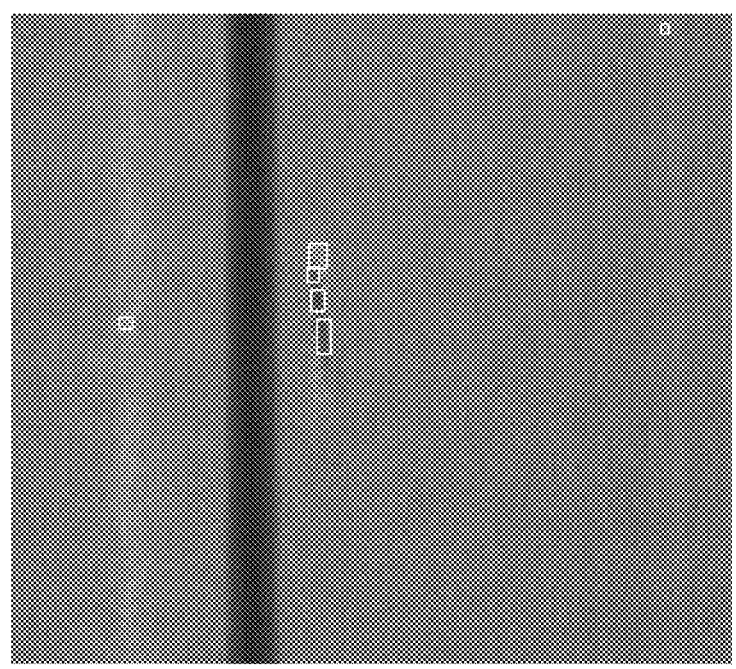
FIG. 28 is a diagram illustrating output image data of the image processing according to the first embodiment.

Subsequently, a defect is extracted by performing a binarizing process of extracting pixels with the luminance difference or more set from the luminance difference image (step SPa7). FIG. 27 illustrates a binarized image from which a defect is extracted from an image with high luminance illustrated in FIG. 26. Subsequently, a defect is determined using a predetermined labeling pixel area as a reference to generate a defect determination image (step SPa8). For example, the labeling pixel area is determined to have a defect with ten or more pixels. FIG. 28 illustrates a defect-determined image from which a defect of the binarized image in FIG. 27 is extracted.

In the inspection device 230, a signal processing unit 231 illustrated in FIG. 6 performs an evaluating process SP9 of determining whether the piston rod 100 is proper based on an imaging result and an image processing result of the line sensor camera 107 in the imaging and inspecting process SP8-3 and the defect detecting process SP8-4 illustrated in FIG. 5 in the foregoing surface inspecting process SP8 illustrated in FIG. 4. That is, based on the number of detected defects and the size of the defect, it is determined whether the piston rod 100 is a superior product or an inferior product. For example, when the number of defects is equal to or greater than a predetermined number, the piston rod 100 is determined to be an inferior product. When there is a critical defect such as a size of the defect that is considerably larger than a predetermined size despite the number of defects that is less than the predetermined number, the piston rod 100 is determined to be an inferior product. Otherwise, the piston rod 100 is determined to be a superior product.

The transport device 260 has a bifurcation unit 265 controlled by the signal processing unit 231. The transport device 260 performs a transport process including a superior product transport process SP10 and an inferior product transport process SP11, wherein the superior product transport process SP 10 performs transporting of the piston rod 100 determined to be a superior product by the inspection device 230 to a superior product line 261 by the bifurcation unit 265 to an assembly line, and wherein the inferior product transport process SP11 performs carrying out of the piston rod 100 determined to be an inferior product to an inferior product line 262 by the bifurcation unit 265. That is, the transport device 260 transports the piston rod 100 to different places in the transport process in accordance with evaluation results of the evaluating process.

As described above, when the irradiation light source is a laser light source, a laser speckle may occur on the screen and speckle noise may be included in the image data captured by the optical sensor. To remove the speckle noise, a screen is vibrated in a device disclosed in Patent Literature 1 and a screen is oscillated in a device disclosed in Patent Literature 2, as described above. However, for example, speckle noise of image data during vibration of a screen has a noise pattern with a waveform shape, as illustrated in FIG. 20. Thus, it is difficult to remove the speckle noise through image processing. When the screen is vibrated or oscillated, vibration therefore occurs. There is a possibility of the vibration affecting measurement.

In contrast, according to the above-described first embodiment, it is possible to mainly obtain the following advantageous effects.

(1) When the outer circumferential surface 100d of the piston rod 100 which is a measurement surface is irradiated with the light beam 10, the reflected light reflected from the outer circumferential surface 100d is projected to the screen 102 to form the optical image 280, and the optical image 280 is captured by the line sensor camera 107 which is an optical sensor, imaging is performed by the line sensor camera 107 with the screen 102 being continuously moved in one direction. Thus, it is easy to remove speckle noise through image processing, and thus it is possible to reduce an influence of the speckle noise. In this way, by reducing the influence of the speckle noise, it is possible to improve measurement accuracy of the outer circumferential surface 100d of the piston rod 100.

(2) The screen 102 is continuously moved in one direction. Therefore, compared to the screen 102 that is vibrated or oscillated, vibration rarely occurs and it is possible to reduce a possibility of the vibration affecting measurement.

(3) When imaging is performed by the line sensor camera 107 with the screen 102 being continuously moved in one direction, the screen 102 is continuously moved at a constant speed irrespective of the position of the optical image 280 in the width direction. Thus, the noise pattern has a vertical stripe shape, as illustrated in FIG. 21, and it is further easy to remove the speckle noise through image processing. Accordingly, measurement accuracy of the outer circumferential surface 100d of the piston rod 100 is further improved.

(4) By forming the screen 102 in a cylindrical shape and continuously rotating the screen 102, the movement of the outer circumferential surface 102a of the screen 102 becomes stable, thereby improving measurement accuracy. Thus, it is easier to remove the speckle noise through image processing. Accordingly, the measurement accuracy of the outer circumferential surface 100d of the piston rod 100 is further improved.

(5) By irradiating the outer circumferential surface 100d of the piston rod 100 which is a measurement surface in a slit shape with the light beam 10 and relatively moving the light beam 10 and the outer circumferential surface 100d of the piston rod 100, the outer circumferential surface 100d is scanned. Therefore, it is possible to measure even the outer circumferential surface 100d of the above-described piston rod 100 which is the curved measurement surface.

(6) The optical image 280 is linearly captured using the line sensor camera 107 as the optical sensor that captures the optical image 280 projected to the screen 102. Therefore, it is possible to shorten a tact time of the measurement.

(7) By continuously moving the screen 102 in one direction, it is possible to perform the imaging in the same depth of focus when the line sensor camera 107 is used as the optical sensor that captures the optical image 280 projected to the screen 102.

(8) The cylindrical outer circumferential surface 102a of the screen 102 is configured by the Lambertian scatter 99. Therefore, the outer circumferential surface 102a can be homogenous and the optical image 280 becomes stable. Therefore, the measurement accuracy of the outer circumferential surface 100d of the piston rod 100 is further improved.

(9) The outer circumferential surface 100d of the piston rod 100 which is a measurement surface has a protruding shape, the light beam 10 is formed in a slit shape with a predetermined width and a predetermined thickness, the light beam 10 is radiated along the protruding outer circumferential surface 100d of the piston rod 100, and the reflected light reflected from the protruding outer circumferential surface 100d of the piston rod 100 is projected to the screen 102 to form the optical image 280. Since the reflected light of the light beam 10 is expanded by the protruding outer circumferential surface 100d of the piston rod 100 and is projected to the screen 102, the measurement accuracy of the outer circumferential surface 100d of the piston rod 100 is further improved.

(10) Part of the light beam 10 passes through the protruding outer circumferential surface 100d of the piston rod 100 which is a protruding measurement surface, is directly projected to the screen 102, and is set as reference light. A surface state of the outer circumferential surface 100d of the piston rod 100 is inspected based on a reflected light intensity distribution of a measurement location of the optical image 280 specified by the reference light. Accordingly, since the position of the measurement location can be specified accurately, the measurement accuracy of the outer circumferential surface 100d of the piston rod 100 is further improved.

(11) In the working process, the outer circumferential surface 100d of the piston rod 100 is subjected to mirror surface processing. In the inspecting process, the outer circumferential surface 100d of the piston rod 100 is irradiated with the light beam 10 and the optical image 280 formed by projecting the reflected light reflected from the outer circumferential surface 100d to the screen 102 is captured by the line sensor camera 107 which is an optical sensor. In the evaluating process, based on an imaging result of the inspecting process, it is determined whether a component is proper. In the transporting process, the piston rod 100 is transported to different places in accordance with evaluation results of the evaluating process. In this way, the piston rod 100 that has the outer circumferential surface 100d which is a measurement surface is manufactured. In this way, when the piston rod 100 is manufactured, inspection accuracy of the inspecting process is further improved, as described above. Therefore, sorting accuracy of a superior product and an inferior product of the piston rod 100 is further improved.

(12) In the image forming process, the outer circumferential surface 100d of the piston rod 100 with a mirror-finished surface is irradiated with the light beam 10, the reflected light reflected from the outer circumferential surface 100d is projected to the screen 102 to form the optical image 280, and the optical image 280 formed on the screen 102 is captured by the line sensor camera 107 which is an optical sensor with the screen 102 being continuously moved at a constant speed in one direction irrespective of a position of the optical image 280 in the width direction in the imaging process.

In this way, the piston rod 100 is inspected. At this time, since the inspection accuracy is further improved, as described above, it is possible to inspect the outer circumferential surface 100d of the piston rod 100 more accurately.

(13) In the measurement device 260, the irradiation unit 290 irradiates the outer circumferential surface 100d of the piston rod 100 which is a measurement surface of a component with the light beam 10 in a slit shape. The movement unit 270 relatively moves the light beam 10 radiated from the irradiation unit 290 and the outer circumferential surface 100d of the piston rod 100. The screen driving motor 300 rotates the screen 102 on which the optical image 280 is formed by projecting the reflected light reflected from the outer circumferential surface 100d of the piston rod 100. The line sensor camera 107 which is an optical sensor captures the optical image 280. The screen driving motor 300 continuously moves the screen 102 in one direction. Therefore, it is easy to remove speckle noise through image processing, and it is possible reduce the influence of the speckle noise. In this way, by reducing the influence of the speckle noise, the measurement accuracy of the outer circumferential surface 100d of the piston rod 100 is improved.

Figure 29:
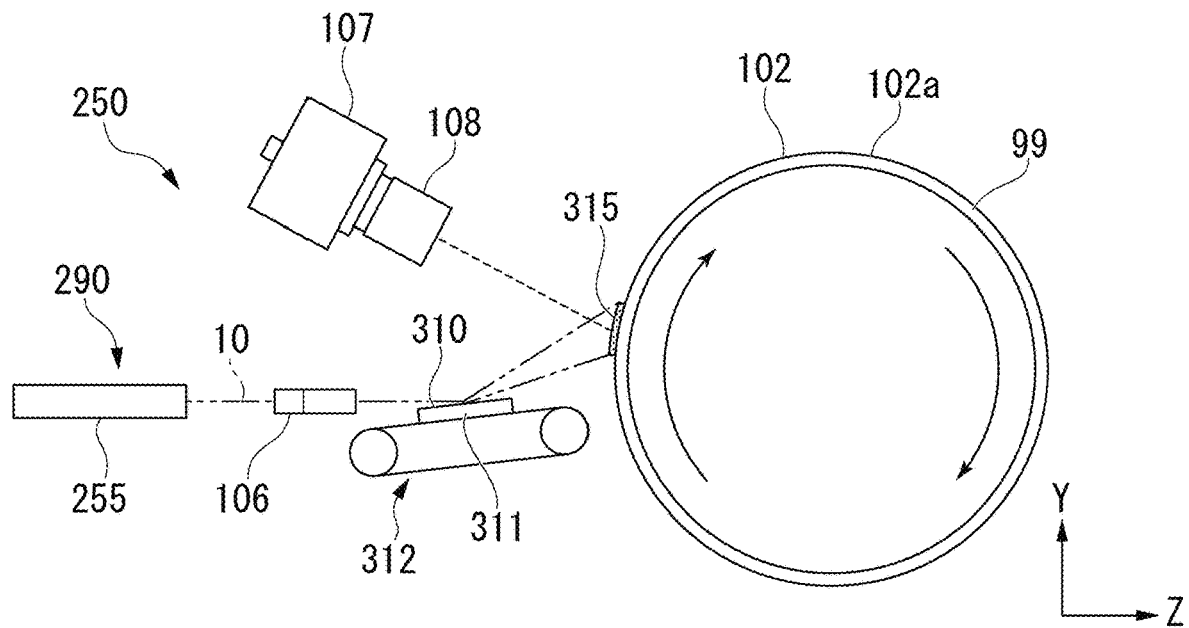
FIG. 29 is a side view illustrating a modified example of the measurement device according to the first embodiment of the present invention.

Here, in the first embodiment, the case in which the protruding outer circumferential surface 100d of the piston rod 100 is scanned and measured as a measurement surface has been described as an example. However, since the line sensor camera 107 is used, it is possible to scan and measure various surfaces as measurement surfaces. For example, as in a modified example illustrated in FIG. 29, while causing a movement unit 312 including a slide movement mechanism to slide a plane 310 of a component 311 that has the plane 310 as a measurement surface within the same plane, reflected light reflected from the plane 310 may be projected to the screen 102 to form an optical image 315 and the optical image 315 may be captured by the line sensor camera 107. Even at this time, the line sensor camera 107 performs imaging in synchronization with the movement unit 312.

Second Embodiment

Figure 30:
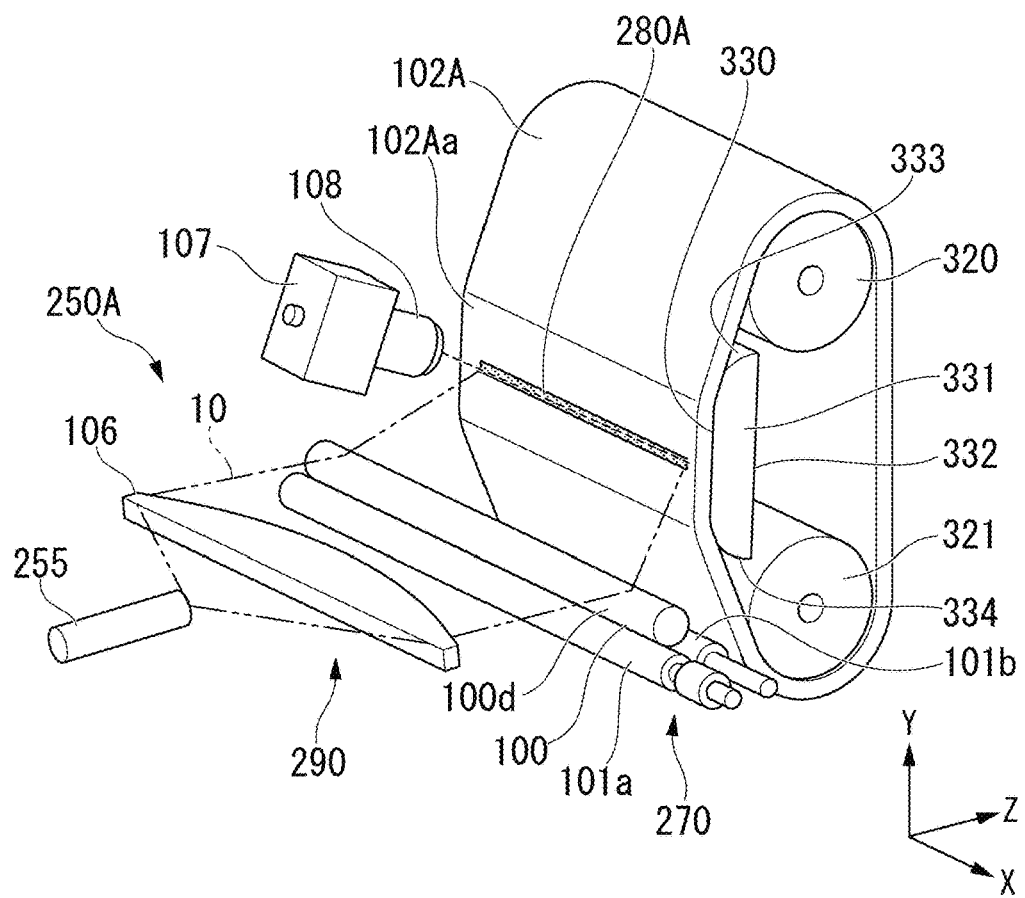
FIG. 30 is a perspective view illustrating a measurement device according to a second embodiment of the present invention.
Figure 31:
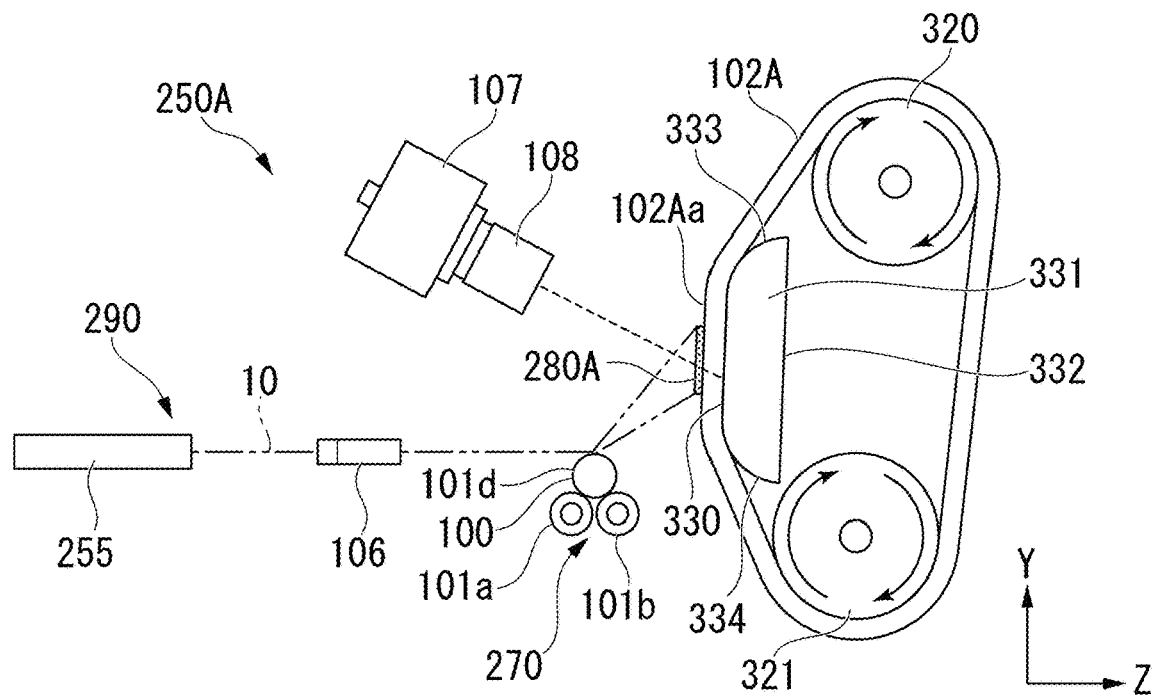
FIG. 31 is a side view illustrating the measurement device according to the second embodiment of the present invention.

Next, in a second embodiment of the present invention, differences from the first embodiment will be mainly described with reference to FIGS. 30 and 31. The same names and the same reference numerals are given common portions to those of the first embodiment.

In the second embodiment, a measurement device 250A includes a screen 102A formed in an endless loop that has a belt-like shape with a constant thickness. In the measurement device 250A according to the second embodiment, the screen 102A is wound around two rotational rollers 320 and 321. The two rotational rollers 320 and 321 both have an outer circumferential surface which is a cylindrical surface and are rotatably supported about a central axis line of the cylindrical shape of the outer circumferential surface. The rotational rollers 320 and 321 are disposed so that the central axis lines are parallel to the X axis and positions thereof in the X direction are aligned. Here, the number of rotational rollers on which the screen 102A is wound may be at least two or may be three or more. Even in this case, the central axis lines of all the rotational rollers are parallel.

In the measurement device 250A according to the second embodiment, a tensioner 331 that has a flat pressure surface 330 is provided at a position between the rotational rollers 320 and 321 in the Y direction. The tensioner 331 is a plate member of which a cross-sectional surface orthogonal to a longitudinal direction has a substantial trapezoidal shape. The tensioner 331 includes the flat pressure surface 330, a flat rear surface 332 parallel to the pressure surface 330, and a pair of connection surfaces 333 and 334 connecting them.

In the pressure surface 330, a length orthogonal to the longitudinal direction is shorter than that of the rear surface 332 and a central position in the direction orthogonal to the longitudinal direction is aligned with that of the rear surface 332. One connection surface 333 connects one end edge of the pressure surface 330 in the direction orthogonal to the longitudinal direction to one end edge of the rear surface 332 in the direction orthogonal to the longitudinal direction. The other connection surface 334 connects the other end edge of the pressure surface 330 in the direction orthogonal to the longitudinal direction to the other end edge of the rear surface 332 in the direction orthogonal to the longitudinal direction. The pair of connection surface 333 and 334 both have a partially cylindrical surface and are curved in a shape protruding outside of the tensioner 331.

The pressure surface 330 of the tensioner 331 is disposed parallel to a plane including the central axis lines of the two rotational rollers 320 and 321, that is, the XY plane, and is disposed at the middle position between the two rotational rollers 320 and 321 in the Y direction. The pressure surface 330 of the tensioner 331 pressurizes the looped screen 102A from the inside of the ring to the outside of the ring. Thus, a projected surface 102Aa which is a flat surface following the pressure surface 330 of the tensioner 331 is formed on the screen 102A. The projected surface 102Aa spreads parallel to the XY surface.

One of the two rotational rollers 320 and 321 is driven by a screen driving motor (not illustrated). Then, the one of the rotational rollers 320 and 321 is driven to rotate the screen 102A and the other rotational roller. Thus, on the screen 102A, a portion forming the projected surface 102Aa is continuously moved in the Y direction. In other words, on the screen 102A, a portion in which an optical image 280A is shown on the projected surface 102Aa is continuously shifted in one direction with respect to the optical image 280A projected to a fixed position.

When the irradiation unit 290 similar to that of the first embodiment forms the light beam 10 in a slit shape with a predetermined width W×a predetermined thickness t1 and radiates the light beam 10 to the outer circumferential surface 100$d$ which is a measurement surface of the piston rod 100 rotated by the movement unit 270 similar to that of the first embodiment, the reflected light from the outer circumferential surface 100$d$ of the piston rod 100 is projected to the flat projected surface 102Aa on the screen 102A to form the optical image 280A and the optical image 280A is captured by the line sensor camera 107 similar to that of the first embodiment. As in the first embodiment, the optical image 280A linearly extends in the X axis direction orthogonal to the Y direction which is a movement direction of a portion forming the projected surface 102Aa of the screen 102A and the entire optical image 280A is projected to the projected surface 102Aa of the screen 102A. As in the first embodiment, the line sensor camera 107 captures the optical image 280A formed on the projected surface 102Aa of the screen 102A in the straight line shape parallel to the X axis.

Even in the second embodiment, the line sensor camera 107 which is an optical sensor performs imaging with the screen 102A being continuously moved in one direction. The line sensor camera 107 performs imaging while the screen 102A is continuously moved at a constant speed irrespective of a position of the optical image 280A in the width direction. On the screen 102A, a portion in which the optical image 280A is shown is moved in the direction orthogonal to the width direction of the optical image 280A.

According to the second embodiment, since the screen 102A is formed in an endless loop that has a belt-like shape and is wound around the two rotational rollers 320 and 321, the projected surface 102Aa can be caused to be flat. In this way, since the optical image 280A is hardly distorted, the measurement accuracy of the outer circumferential surface 100$d$ of the piston rod 100 is further improved.

Third Embodiment

Next, in a third embodiment of the present invention, differences from the first embodiment will be mainly described with reference to FIG. 32. The same names and the same reference numerals are given common portions to those of the first embodiment.

Figure 32:
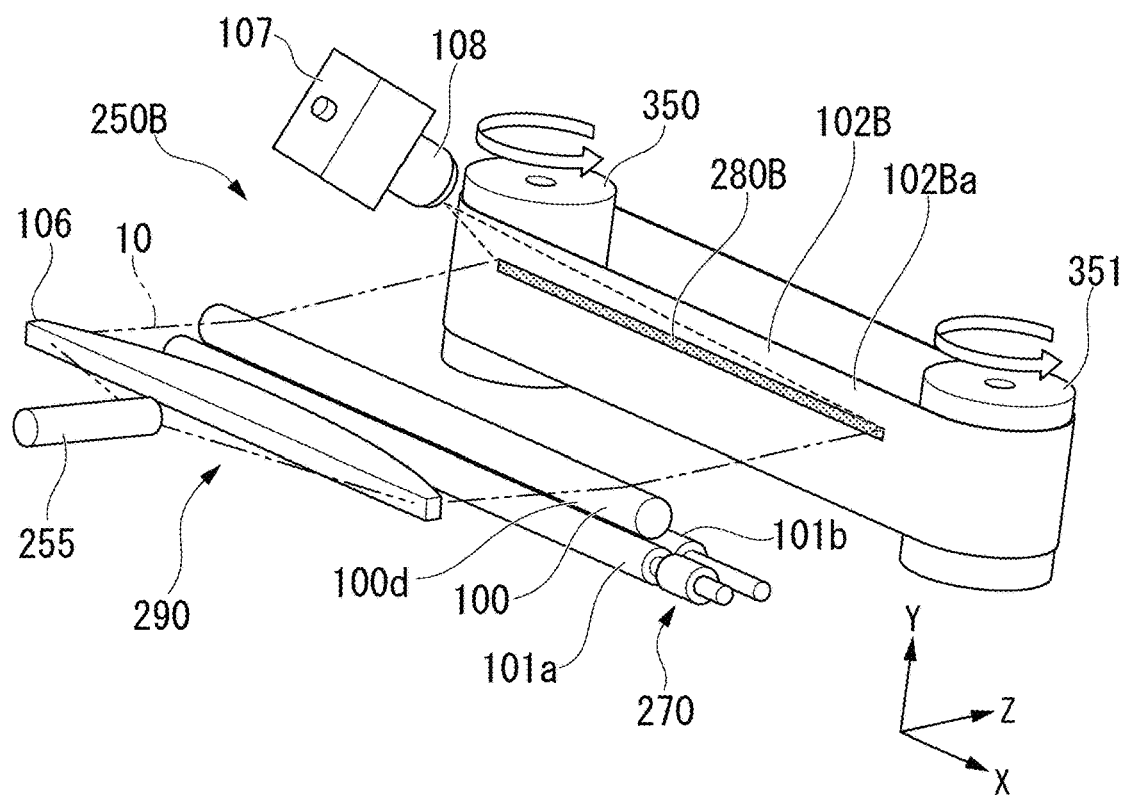
FIG. 32 is a perspective view illustrating a measurement device according to a third embodiment of the present invention.

In the third embodiment, a measurement device 250B includes a screen 102B formed in an endless loop that has a belt-like shape with a constant thickness, as illustrated in FIG. 32. In the measurement device 250B according to the third embodiment, the screen 102B is wound around two rotational rollers 350 and 351. The two rotational rollers 350 and 351 both have an outer circumferential surface which is a cylindrical surface and are rotatably supported about a central axis line of the cylindrical shape of the outer circumferential surface. The rotational rollers 350 and 351 are disposed so that the central axis lines are parallel to the Y axis, a position thereof in the Y direction is aligned, and a position thereof in the Z direction is aligned. Here, the number of rotational rollers on which the screen 102B is wound may be at least two or may be three or more. Even in this case, the central axis lines of all the rotational rollers are parallel.

The measurement device 250B according to the third embodiment forms a projected surface 102Ba which is a plane between the rotational rollers 350 and 351 in the screen 102B. The projected surface 120Ba spreads parallel to the XY plane.

One of the two rotational rollers 350 and 351 is driven by a screen driving motor (not illustrated). Then, the one of the rotational rollers 350 and 351 is driven to rotate the screen 102B and the other rotational roller. Thus, on one screen 102B, a portion forming the projected surface 102Ba continuously moves in the X direction. In other words, on the screen 102B, a portion in which an optical image 280B is shown on the projected surface 102Ba is continuously shifted in one direction with respect to the optical image 280B projected to a fixed position.

The irradiation unit 290 similar to that of the first embodiment forms the light beam 10 in a slit shape with a predetermined width W×a predetermined thickness t1 and radiates the light beam 10 to the outer circumferential surface 100$d$ which is a measurement surface of the piston rod 100 rotated by the movement unit 270 similar to that of the first embodiment. Then, the light reflected from the outer circumferential surface 100$d$ of the piston rod 100 is projected to the flat projected surface 102Ba on the screen 102B and the optical image 280B is formed. The optical image 280B is captured by the line sensor camera 107 similar to that of the first embodiment. The optical image 280B linearly extends in a direction following the movement direction of a portion forming the projected surface 102Ba of the screen 102B, that is, the X axis direction. As in the first embodiment, the line sensor camera 107 captures the optical image 280B formed on the screen 102B in the straight line shape parallel to the X axis.

Even in the third embodiment, the line sensor camera 107 which is an optical sensor performs imaging with the screen 102B being continuously moved in one direction. The line sensor camera 107 performs imaging while the screen 102B is continuously moved at a constant speed irrespective of a position of the optical image 280B in the width direction. On the screen 102B, a portion in which the optical image 280B is shown is moved in the width direction of the optical image 280B.

According to the third embodiment, since the screen 102B is formed in an endless loop that has a belt-like shape and is wound around the two rotational rollers 350 and 351, the projected surface 102Ba can be caused to be flat. In this way, since the optical image 280B is hardly distorted, the measurement accuracy of an outer circumferential surface 101$a$ of the piston rod 101 is further improved.

According to a first aspect of the above-described embodiments, a surface measurement method includes: irradiating a measurement surface with a coherent light beam; projecting reflected light reflected from the measurement surface to a screen to form an optical image; and capturing the optical image by an optical sensor. The optical image is captured by the optical sensor when the screen is continuously moved in one direction. Thus, it is possible to reduce an influence of speckle noise and measurement accuracy is improved.

According to a second aspect, in the surface measurement method according to the first aspect, the screen is continuously moved at a constant speed irrespective of a position of the optical image in a width direction. Thus, a movement speed of the screen is constant irrespective of a position of the optical image in the width direction, a noise pattern has a vertical stripe shape, and thus measurement accuracy is improved.

According to a third aspect, in the surface measurement method according to the second aspect, the screen is formed in a cylindrical shape and is continuously rotated. Thus, a surface movement of the screen becomes stable, and thus the measurement accuracy is improved.

According to a fourth aspect, in the surface measurement method according to the third aspect, the measurement surface is irradiated with the light beam in a slit shape. The measurement surface is scanned by relatively moving the measurement surface and the light beam. Thus, measurement can be performed even when the measurement surface is a curved surface.

According to a fifth aspect, in the surface measurement method according to the fourth aspect, the optical sensor is a line sensor and captures the optical image in a linear shape. Thus, it is possible to shorten a tact time of the measurement.

According to a sixth aspect, in the surface measurement method according to the third aspect, an outer circumferential surface of the cylindrical shape of the screen is configured as a scattering reflector. Thus, since the surface of the screen can be homogenous and the optical image becomes table, the measurement accuracy is improved.

According to a seventh aspect, in the surface measurement method according to the second aspect, the screen is formed of a belt-like shape and an endless ring and is wound around at least two rotational rollers. The screen is continuously moved in one direction by rotatably driving the rotational rollers. Thus, since the projected surface of the screen becomes flat and the optical image is hardly distorted, the measurement accuracy can be improved.

According to an eighth aspect, in the surface measurement method according to the second aspect, the measurement surface has a protruding shape. The light beam is formed in a slit shape with a predetermined width and a predetermined thickness. The light beam is radiated along the protruding measurement surface and reflected light reflected from the protruding measurement surface is projected to the screen to form the optical image. Thus, since the reflected light of the light beam is expanded by the measurement surface which is a protruding surface, the measurement accuracy is improved.

According to a ninth aspect, in the surface measurement method according to the eighth aspect, part of the light beam passes through the protruding measurement surface, is directly projected to the screen, and is set as reference light. A surface state of the measurement surface is inspected based on a reflected light intensity distribution of a measurement location of the optical image specified by the reference light. Thus, the position of a measurement location can be specified, and the measurement accuracy is improved.

According to a tenth embodiment, a method of manufacturing a component having a measurement surface includes: a processing step of performing mirror surface processing on the measurement surface; an inspection step of irradiating the measurement surface with a coherent light beam, projecting reflected light reflected from the measurement surface to a screen to form an optical image, and capturing the optical image by an optical sensor; an evaluating step of determining whether the component is proper based on an imaging result of the inspection step; and a transporting step of transporting the component to a different location in accordance with an evaluation result of the evaluating step. The inspection step is performed while continuously moving the screen in one direction. Thus, it is possible to reduce an influence of speckle noise in the inspecting step and inspection accuracy can be improved.

According to an eleventh aspect, in the method according to the tenth aspect, the screen is continuously moved at a constant speed irrespective of a position of the optical image in a width direction. Thus, a movement speed of the screen is constant irrespective of a position of the optical image in the width direction, a noise pattern has a vertical stripe shape, and thus inspection accuracy is improved.

According to a twelfth aspect, in the method according to the eleventh aspect, the screen is formed in a cylindrical shape and is continuously rotated. Thus, a surface movement of the screen becomes stable, and thus the inspection accuracy is improved.

According to a thirteenth aspect, in the method according to the twelfth aspect, the measurement surface has a protruding shape. The light beam is formed in a slit shape with a predetermined width and a predetermined thickness. The light beam is radiated along the protruding measurement surface and reflected light reflected from the protruding measurement surface is projected to the screen to form the optical image. Thus, since the reflected light of the light beam is expanded by the measurement surface which is a protruding surface, inspection accuracy is improved.

According to a fourteenth aspect, in the method according to the thirteenth aspect, part of the light beam passes through the protruding measurement surface, is directly projected to the screen, and is set as reference light. A surface state of the measurement surface is inspected based on a reflected light intensity distribution of a measurement location of the optical image specified by the reference light. Thus, the position of a measurement location can be specified, and the inspection accuracy is improved.

According to a fifteenth aspect, in the method according to the eleventh aspect, the screen is formed of a belt-like shape and an endless ring and is wound around at least two rotational rollers. The screen is continuously moved in one direction by rotatably driving the rotational rollers. Thus, since the projected surface of the screen is flat and the optical image is hardly distorted, the inspection accuracy is improved.

According to a sixteenth aspect, a method of inspecting a component having a measurement surface with a mirrored surface includes: an image forming step of irradiating the measurement surface with a coherent light beam and projecting reflected light reflected from the measurement surface to a screen to form an optical image; and an imaging step of causing an optical sensor to capture the optical image formed on the screen. The imaging step is performed while continuously moving the screen in one direction at a constant speed irrespective of a position of the optical image in a width direction. Thus, it is possible to reduce an influence of speckle noise in the imaging step and the inspection accuracy can be improved.

According to a seventeenth aspect, in the method according to the sixteenth aspect, the screen is formed in a cylindrical shape and is continuously rotated. Thus, a surface movement of the screen becomes stable, and thus the inspection accuracy is improved.

According to an eighteenth aspect, in the method according to the seventeenth aspect, the measurement surface has a protruding shape. The light beam is formed in a slit shape with a predetermined width and a predetermined thickness. The light beam is radiated along the protruding measurement surface and reflected light reflected from the protruding measurement surface is projected to the screen to form the optical image. Thus, the reflected light of the light beam is expanded by the measurement surface formed as a protruding surface, the inspection accuracy is improved.

According to a nineteenth aspect, in the method according to the sixteenth aspect, the screen is formed of a belt-like shape and an endless ring and is wound around at least two rotational rollers. The screen is continuously moved in one direction by rotatably driving the rotational rollers. Thus, since the projected surface of the screen is flat and the optical image is hardly distorted, the inspection accuracy can be improved.

According to a twentieth aspect, a measurement device measuring a measurement surface of a component includes: an irradiation unit configured to form a coherent light beam in a slit shape and radiate the light beam toward the measurement surface of the component; a movement unit configured to relatively move the light beam radiated from the irradiation unit and the measurement surface of the component; a screen on which reflected light reflected from the measurement surface of the component is projected to form an optical image; an optical sensor configured to capture the optical image; and a driving source configured to continuously move the screen in one direction. Thus, it is possible to reduce an influence of speckle noise and the measurement accuracy is improved.

INDUSTRIAL APPLICABILITY

The surface measurement method, the component manufacturing method, the component inspection method, and the component measurement device are capable of reducing an influence of speckle noise.

REFERENCE SIGNS LIST

10 Light beam
99 Lambertian scatter (scattering reflector)
100 Piston rod (component)
100*d* Outer circumferential surface (measurement surface)
102, 102A, 102B Screen
102*a* Outer circumferential surface (projected surface)
102Aa, 102Ba Projected surface
107 Line sensor camera (optical sensor)
150 Component
151 Irradiation light (light beam)
170, 280, 280A, 280B, 315 Optical image
250, 250A, 250B Measurement device
270, 312 Movement unit
290 Irradiation unit
300, 300A, 300B Screen driving motor (driving source)
310 Plane (projected surface)
311 Component
320, 321, 350, 351 Rotational roller

The invention claimed is:

1. A surface measurement method comprising:
irradiating a measurement surface with a coherent light beam;
projecting reflected light reflected from the measurement surface to a screen to form an optical image; and
capturing the optical image by an optical sensor,
wherein the optical image is captured by the optical sensor when the screen is continuously moved in one direction at a constant speed irrespective of a position of the optical image in a width direction, and
wherein the screen is formed in a cylindrical shape and is continuously rotated.

2. The surface measurement method according to claim 1,
wherein the measurement surface is irradiated with the light beam in a slit shape, and
wherein the measurement surface is scanned by relatively moving the measurement surface and the light beam.

3. The surface measurement method according to claim 2, wherein the optical sensor is a line sensor and captures the optical image in a linear shape.

4. The surface measurement method according to claim 1, wherein an outer circumferential surface of the cylindrical shape of the screen is configured as a scattering reflector.

5. The surface measurement method according to claim 1,
wherein the measurement surface has a protruding shape,
wherein the light beam is formed in a slit shape with a predetermined width and a predetermined thickness, and
wherein the light beam is radiated along the protruding measurement surface and reflected light reflected from the protruding measurement surface is projected to the screen to form the optical image.

6. The surface measurement method according to claim 5,
wherein part of the light beam passes through the protruding measurement surface, is directly projected to the screen, and is set as reference light, and
wherein a surface state of the measurement surface is inspected based on a reflected light intensity distribution of a measurement location of the optical image specified by the reference light.

7. A surface measurement method comprising:
irradiating a measurement surface with a coherent light beam;
projecting reflected light reflected from the measurement surface to a screen to form an optical image; and
capturing the optical image by an optical sensor,
wherein the optical image is captured by the optical sensor when the screen is continuously moved in one direction,
wherein the screen is continuously moved at a constant speed irrespective of a position of the optical image in a width direction,
wherein the screen is formed in a belt-like shape and an endless ring and is wound around at least two rotational rollers, and
wherein the screen is continuously moved in one direction by rotatably driving the rotational rollers.

8. A method of manufacturing a component having a measurement surface, the method comprising:
a processing step of performing mirror surface processing on the measurement surface;
an inspection step of irradiating the measurement surface with a coherent light beam, projecting reflected light reflected from the measurement surface to a screen to form an optical image, and capturing the optical image by an optical sensor;
an evaluating step of determining whether the component is proper based on an imaging result of the inspection step; and
a transporting step of transporting the component to a different location in accordance with an evaluation result of the evaluating step, wherein the inspection step is performed while continuously moving the screen in one direction at a constant speed irrespective of a position of the optical image in a width direction, and wherein the screen is formed in a cylindrical shape and is continuously rotated.

9. The method of manufacturing the component according to claim 8, wherein the measurement surface has a protruding shape, wherein the light beam is formed in a slit shape with a predetermined width and a predetermined thickness, and wherein the light beam is radiated along the protruding measurement surface and reflected light reflected from the protruding measurement surface is projected to the screen to form the optical image.

10. The method of manufacturing the component according to claim 9, wherein part of the light beam passes through the protruding measurement surface, is directly projected to the screen, and is set as reference light, and wherein a surface state of the measurement surface is inspected based on a reflected light intensity distribution of a measurement location of the optical image specified by the reference light.

11. A method of manufacturing a component having a measurement surface, the method comprising:

a processing step of performing mirror surface processing on the measurement surface;

an inspection step of irradiating the measurement surface with a coherent light beam, projecting reflected light reflected from the measurement surface to a screen to form an optical image, and capturing the optical image by an optical sensor;

an evaluating step of determining whether the component is proper based on an imaging result of the inspection step; and a transporting step of transporting the component to a different location in accordance with an evaluation result of the evaluating step, wherein the inspection step is performed while continuously moving the screen in one direction, wherein the screen is continuously moved at a constant speed irrespective of a position of the optical image in a width direction, wherein the screen is formed in a belt-like shape and an endless ring and is wound around at least two rotational rollers, and wherein the screen is continuously moved in one direction by rotatably driving the rotational rollers.

12. A method of inspecting a component having a measurement surface with a mirrored surface, the method comprising:

an image forming step of irradiating the measurement surface with a coherent light beam, projecting reflected light reflected from the measurement surface to a screen to form an optical image; and an imaging step of causing an optical sensor to capture the optical image formed on the screen, wherein the imaging step is performed while continuously moving the screen in one direction at a constant speed irrespective of a position of the optical image in a width direction, wherein the screen is formed in a cylindrical shape and is continuously rotated.

13. The method of inspecting the component according to claim 12, wherein the measurement surface has a protruding shape, wherein the light beam is formed in a slit shape with a predetermined width and a predetermined thickness, and wherein the light beam is radiated along the measurement surface and reflected light reflected from the protruding measurement surface is projected to the screen to form the optical image.

14. A method of inspecting a component having a measurement surface with a mirrored surface, the method comprising:

an image forming step of irradiating the measurement surface with a coherent light beam, projecting reflected light reflected from the measurement surface to a screen to form an optical image; and an imaging step of causing an optical sensor to capture the optical image formed on the screen, wherein the imaging step is performed while continuously moving the screen in one direction at a constant speed irrespective of a position of the optical image in a width direction, wherein the screen is formed in a belt-like shape and an endless ring and is wound around at least two rotational rollers, and wherein the screen is continuously moved in one direction by rotatably driving the rotational rollers.

15. A measurement device measuring a measurement surface of a component, the measurement device comprising:

an irradiation unit configured to form a coherent light beam in a slit shape and radiating the light beam toward the measurement surface of the component;

a movement unit configured to relatively move the light beam radiated from the irradiation unit and the measurement surface of the component;

a screen on which reflected light reflected from the measurement surface of the component is projected to form an optical image;

an optical sensor configured to capture the optical image; and a driving source configured to continuously move the screen in one direction at a constant speed irrespective of a position of the optical image in a width direction, wherein the screen is formed in a cylindrical shape and is continuously rotated.

\* \* \* \* \*